US012634246B2

(12) United States Patent
Livne et al.

(10) Patent No.: US 12,634,246 B2
(45) Date of Patent: May 19, 2026

(54) MECHANISM TO IMPLEMENT TIME STAMP-BASED TRANSMISSIONS FROM AN NETWORK INTERFACE DEVICE OF A DATACENTER

(71) Applicant: Intel Corporation, Santa Clara, CA (US)

(72) Inventors: Sarig Livne, Shchanya (IL); Noam Elati, Zichron Yaakov (IL); Yotam Nizri, Mevaseret Tzion (IL); Gregory Nizan Miron, Moshav Zippori (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/957,888

(22) Filed: Sep. 30, 2022

(65) Prior Publication Data

US 2023/0050776 A1     Feb. 16, 2023

(51) Int. Cl.
*H04L 69/22*     (2022.01)
*H04L 45/74*     (2022.01)
*H04L 47/52*     (2022.01)
*H04L 49/9047*     (2022.01)

(52) U.S. Cl.
CPC ........ *H04L 49/9047* (2013.01); *H04L 47/521* (2013.01)

(58) Field of Classification Search
CPC ..... H04L 49/9047; H04L 47/52; H04L 69/22; H04L 45/74

USPC .......................................................... 709/224
See application file for complete search history.

(56) References Cited

U.S. PATENT DOCUMENTS

2017/0150242 A1 *    5/2017    Koren ................. H04L 49/9078

OTHER PUBLICATIONS

"4.3. Precision Time Measurement (PTM)." Intel, https://www.intel.com/content/www/us/en/docs/programmable/683140/21-4-4-0-0/precision-time-measurement-ptm-58323.html. Accessed Oct. 27, 2022, 2 pages.

* cited by examiner

*Primary Examiner* — Jude Jean Gilles
(74) *Attorney, Agent, or Firm* — Alliance IP, LLC

(57) ABSTRACT

A circuitry of a network interface device of a computing network is to: access a first message from a server architecture of the computing network, the first message including a timestamp based on a time at which the circuitry is to access, from a host memory, one or more data packet descriptors that correspond to a data packet to be transmitted to the computing network from the network interface device; send, for transmission to the server architecture and at a transmission time based on the timestamp, a second message, the second message including a request to access the one or more data packet descriptors; and subsequent to sending the second message for transmission, access the one or more data packet descriptors to determine one or more addresses for the data packet in the host memory.

25 Claims, 7 Drawing Sheets

N P - Non Paced Packet Descriptors
D - "Dummy" TS Descriptors
LSO - Paced LSO Packet

Figure 7:
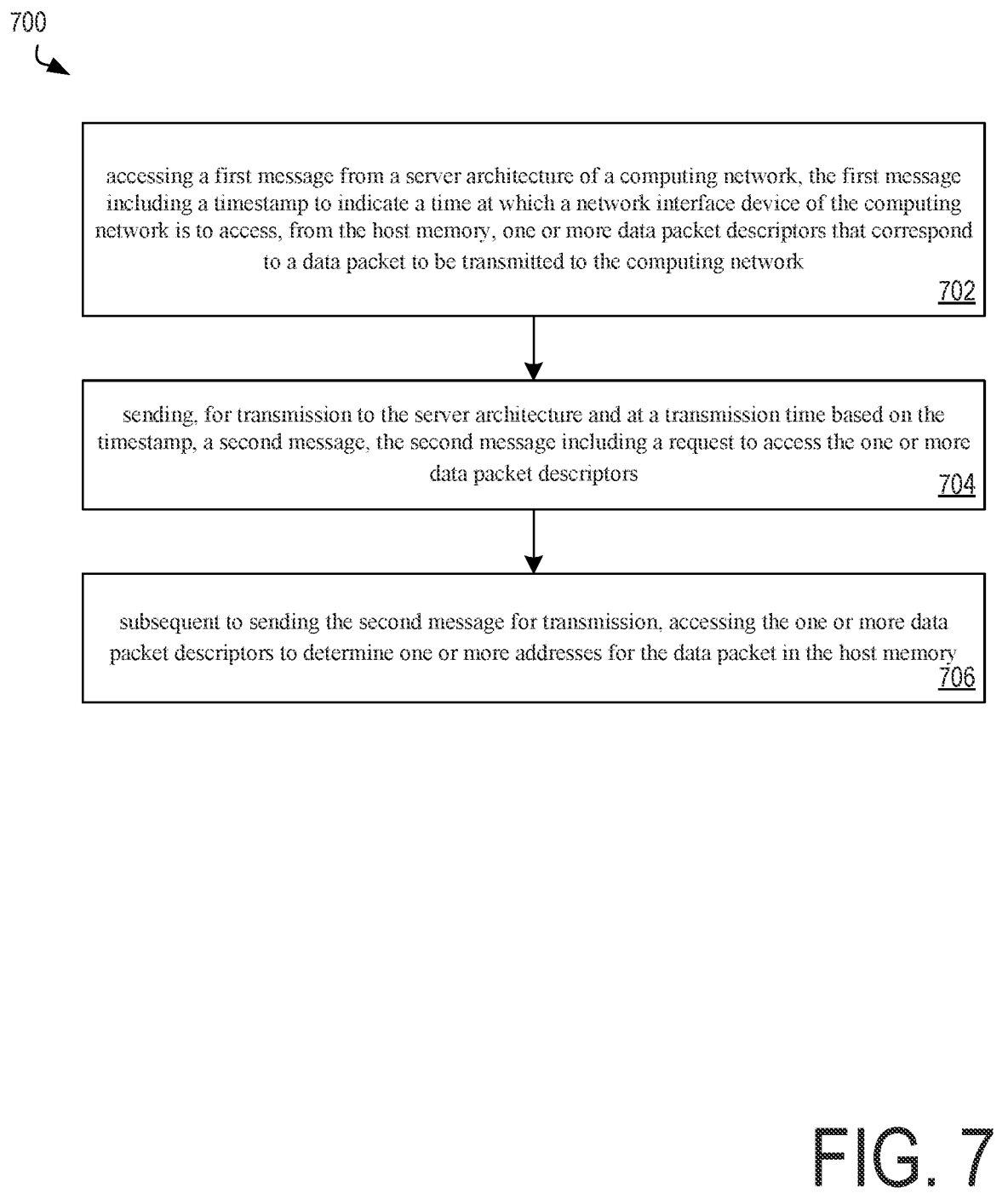

700 accessing a first message from a server architecture of a computing network, the first message
including a timestamp to indicate a time at which a network interface device of the computing
network is to access, from the host memory, one or more data packet descriptors that correspond
to a data packet to be transmitted to the computing network

702 sending, for transmission to the server architecture and at a transmission time based on the
timestamp, a second message, the second message including a request to access the one or more
data packet descriptors

704 subsequent to sending the second message for transmission, accessing the one or more data
packet descriptors to determine one or more addresses for the data packet in the host memory

MECHANISM TO IMPLEMENT TIME STAMP-BASED TRANSMISSIONS FROM AN NETWORK INTERFACE DEVICE OF A DATACENTER

BACKGROUND

Datacenters continue to witness an ever-increasing demand for various time-sensitive applications, such as video streaming applications, audio streaming applications, augmented reality applications, virtual reality applications, other streaming applications such as game streaming applications, and telecommunications applications, which require transmit packets to be paced according to predefined bandwidth and/or predefined jitter Quality of Service (QoS) requirements. Pacing with respect to datacenter transmit queues is usually implemented using a local system timer (e.g., a Precision Time Protocol or "PTP" timer). A PTP timer uses the PTP protocol to synchronize clocks throughout a computing network, such as a datacenter. Pacing aims to achieve a relatively high user experience with a time sensitive application, mitigating glitches or freezing at the receiver side (e.g., a client device within the computing network). However, limited buffer sizes in data and control paths from server architectures toward client devices, such as buffer sizes for buffers within a network interface card (NIC) may cause enough jitter to lead to data packets drops and an ultimate reduction in the quality of the user experience.

The state of the art uses three major approaches to solve the above issue.

According to a first and most popular existing approach, a pacing of flows including hardware queues in a direction from the server architecture toward the network is implemented in software at the server architecture prior to posting the hardware queues (e.g., signal traffic from the server architecture toward the network) to a NIC. The NIC takes the queues including timing information from the server architecture and transmits the corresponding packets accordingly.

According to a second approach, when a NIC is routing a set (relatively small) number of hardware transmit queues while packet descriptors for subsequent packets include increasing timestamps from the software at the server side, the NIC prefetches the subsequent packet and stores them at the NIC buffers, waiting until individual timestamps before transmitting the corresponding packet, which transmission can be achieved with nanosecond (ns) accuracy.

According to a third approach, a packet context prefetch is implemented, where the packet context contains the timestamp of fetching the packet, which timestamp indicates a time prior to the transmission and is stored on the NIC. A hardware (HW)/software (SW) combined algorithm assigns a packet to a precise transmit timeslot independently of host queues and how of the timestamp was generated. Packets are thus organized in transmission time slots regardless of their source at the HW pipe buffers until the time of their transmission.

BRIEF DESCRIPTION OF THE DRAWINGS

FIG. 7 depicts a process according to some embodiments.

DETAILED DESCRIPTION

Figure 1:
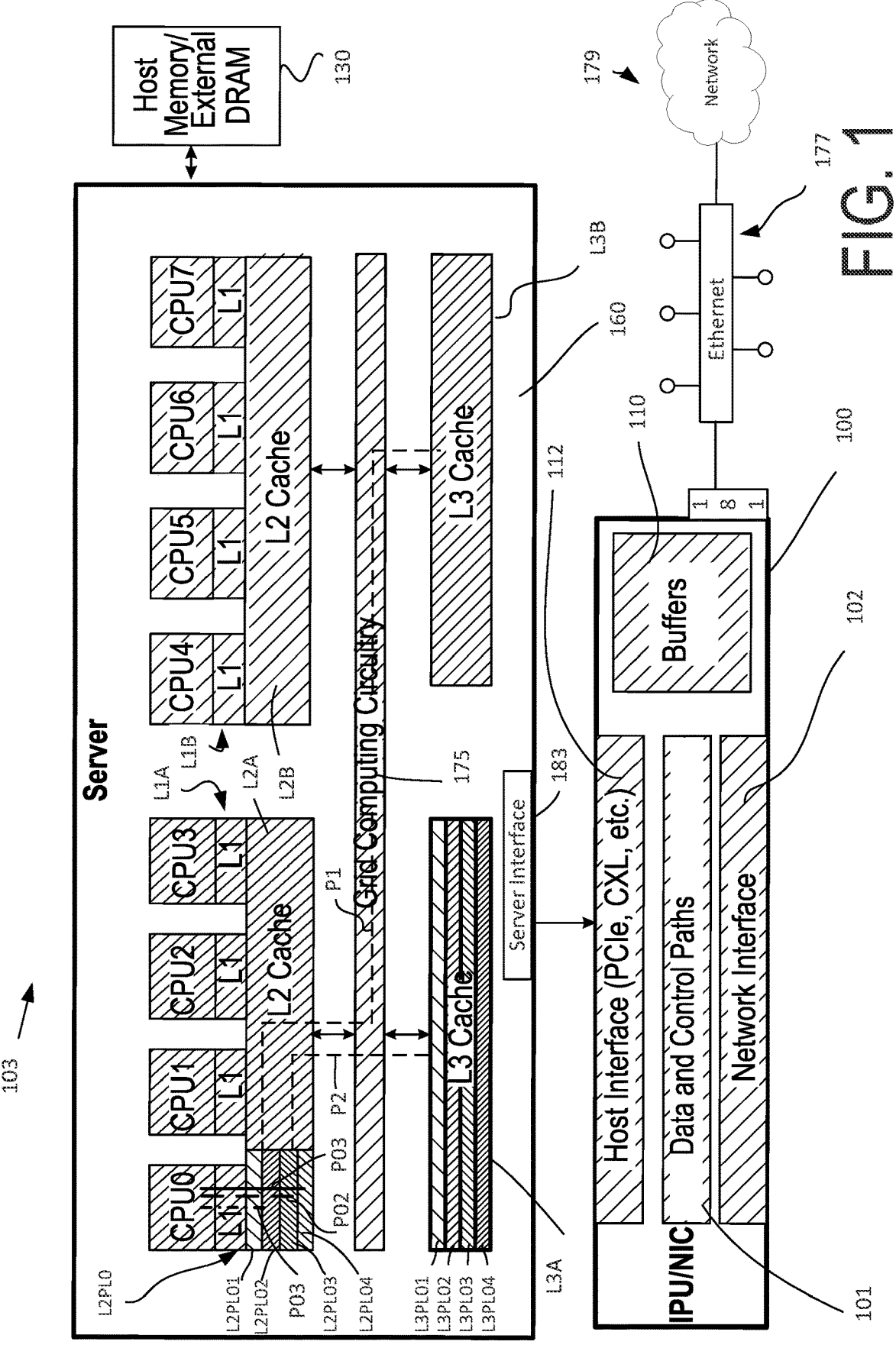
FIG. 1 depicts in schematic form an example computing system including the server of FIG. 1, coupled with a host memory and a network interface device according to an embodiment.

Some embodiments provide a mechanism to provide a timestamp to a network interface device to let the network interface device know when to fetch data packets from a host memory of a computing network.

Some embodiments propose the implementation of host transmit queues that provide per packet pacing information from the SW (e.g., on the server side) to the HW (e.g., in the network interface device side). The novel host transmit queues according to embodiments include timestamp (TS) information implemented at the server architecture and used by the network interface device to pace the fetching of packets from a host memory and the transmission of those packets to the network in a timely and efficient manner.

Advantageously the network interface device (e.g., a NIC or an Infrastructure Processing Unit (IPU)) that manages novel host transmit queues and that enforces the packet transmission time is relatively simple to implement, and is further scalable with the number of incoming host queues anticipated.

Advantageously, some embodiments bring about a major improvement in the utilization of computing units (e.g., central processing units (CPUs)) at a server architecture as compared with solutions of the prior art, while further advantageously providing ns scale resolution of packet posting "on the wire" (e.g., posting from the host interface of the network interface device to a controller of the network interface device for scheduling and routing) at the network interface device side.

Advantageously, some embodiments provide both an area- and power-efficient solution that provides precise (ns-granularity) pacing of per packet or per group of packets transmissions while minimizing jitter.

Advantageously, some embodiments allow the preservation of operation with respect to legacy queues and legacy flow management that aim to minimize SW overhead and preserve backward compatibility.

Advantageously, some embodiments make it possible for the SW to no longer constantly scan the pacing queue to detect a packet with an expired time stamp, which can consume a large number of SW cycles.

According to some embodiments, SW may generate time stamps for a large batch of packets a long time before transmission of those packets. The latter may depend on a coarse time stamp of a TS descriptor queue of embodiments, its granularity and bits, such as 50 ms. Advantageously, according to some embodiments, SW is freed to do other tasks rather than monitoring or scanning pacing queues, while HS is paced on the fetching. When batch transmission takes place, according to some embodiments (as indicated by a HW Descriptor Write back, occasional scanning or interrupt), the SW can generate another batch of TS descriptor queues.

According to some embodiments, host transmit queues from SW on a server architecture to HW on a network interface device, such as host transmit queues on a server interface (e.g., host bus) of a server architecture, or on a host interface (e.g., host bus) of a network interface device, include a timestamp per packet or a timestamp per groups of packets.

A problem being addressed by some embodiments is the latency between the SW application on the server side that is doing the timestamping and the HW on the network interface side that is sending a corresponding packet using legacy interfaces.

Another problem being addressed by some embodiments is that of limited buffering resources or "buffer overrun," especially when a concurrent operation of thousands of paced queues is required. In those cases, the packet data should be fetched using a direct memory access request ("DMA'd") from the host memory slightly prior the time to be transmitted to the network. When using legacy queues, the packet data is DMA'd as soon as the queue is scheduled for transmission to the network by the HW QoS scheduler of the network interface device, rather than being fetched slightly prior to the time of transmission. In order to not overfill the HW buffers, the SW within the server would typically need to generate a packet transmission command ("transmission doorbell" or DB) to the HW, just in time, slightly prior the transmission time of the packet from the HW. This will disadvantageously (a) impose a high SW complexity and low SW efficiency on the server side; and (b) will make the resulting latency at the SW to HW interface and accompanying jitter negatively affect the pacing accuracy of packet transmissions to the network.

For the purposes of the present disclosure, the term "processing circuitry" refers to constructs able to process data, such as processes, threads, virtual machines, and FPGA programs.

For the purposes of this disclosure, a "computing unit" includes any physical component, or logical arrangement of physical components, capable of processing some or all of a network packet. Example computing units include, but are not limited to a CPU, a core, a CPU complex, a server complex, a field programmable gate array (FPGA), an ASIC, a graphics processing unit (GPU), or other co-processors.

A "memory circuitry" as used herein, used in the context of a server architecture includes a memory structure which may include at least one of a buffer, a cache (such as a L1, L2, L3 or other level cache including last level cache), an instruction cache, a data cache, a first in first out (FIFO) memory structure, a last in first out (LIFO) memory structure, a time sensitive/time aware memory structure, a ternary content-addressable memory (TCAM) memory structure, a register file such as a nanoPU device, a tiered memory structure, a two-level memory structure, a memory pool, or a far memory structure, to name a few.

In the following figures, like components will be referred to with like and/or the same reference numerals. Therefore, detailed description of such components may not be repeated from figure to figure.

FIGS. 1-4 show examples architectures relating to a computing network, such as a datacenter, according to some embodiments.

FIG. 1 shows an example computing system 103 of a datacenter. The computing system 103 includes a server architecture 160 coupled to a host memory 130 and to a network interface device 100. The network interface device may, for example, include an Infrastructure Processing Unit (IPU) or a network interface card (NIC).

Server architecture (or server) 160 of computing system 103 may include two subsystems A and B of CPUs and their associated caches L1-L3. Subsystem A includes CPUs 0, 1, 2, and 3, their respective local L1 caches L1A, and their L2 cache L2A. Subsystem B includes CPUs 0, 1, 2, and 3, their respective local L1 caches L1B, and their L2 cache L2B. The L2 caches are shared by all CPUs of a subsystem in the shown example. The L3 caches L3A and L3B are also specific to each subsystem in the example of FIG. 1, although there could be a single L3 cache that is shared by all CPUs. L3 caches tend to be very large in terms of area, especially when they are shared among all subsystems of a server architecture.

The L3 cache, in the depicted example, are shown as being coupled to their respective L2 caches L2A and L2B by way of a grid computing circuitry 175 (e.g., a UNCORE (Uniform Interface to Computing Resources)).

A server architecture may include any number of subsystems with each subsystem including any number of computing units (e.g., CPUs) and any number of associated memory circuitries (e.g., caches) in any configuration. In addition, the use of a grip computing circuitry, such as a grid computing circuitry, or other similar grid computing technology is optional.

The grid computing circuitry 175 may create target system specific actions from a XML workload description (Abstract Workload Objects, AWO) received from a client of the computing system. Available grid computing circuitry services may include workload submission and workload management, file access, file transfer (both client-server and server-server), storage operations, and workflow submission and management.

The server architecture may include a network interface device interface 183 (e.g., a bus) using at least one of Peripheral Component Interconnect (PCI), PCI express (PCIe), PCIx, Universal Chiplet Interconnect Express (UCIe), Intel On-chip System Fabric (IOSF), Gen-Z, Open Coherent Accelerator Processor Interface (OpenCAPI), and/or Compute Express Link (CXL), Serial ATA, and/or USB compatible interface (although other interconnection standards may be used). Interface 183 is to couple the server architecture to the network interface device to communicate data signals and control signals therewith.

The shown network interface device 100 may include a network interface 181 which is connected to Ethernet 177. The Ethernet 177 may connect the computing system 103 to a network 179 including client devices (not shown). At the other end of the network interface device, a host interface 112 may connect the network interface device with the server architecture 160, for example using a same communication protocol as that of interface 183. Host interface 112 is to communicate with network interface device interface 183 of the server architecture. Between the network interface 181 and the host interface 112, controller 101 is to control a flow of signals within the network interface device, for example by routing data packets between the network 179 and the server 103. The controller 101 may implement, for example, a FleXible Parser (FXP), or one or more of many different other protocols (e.g., RDMA, NVMe, Encryption, etc.) as well as packet storage and decryption. In the ingress direction, controller 101 may be configured to place the data at various locations in the host memory 130.

The controller 101 may perform operations on a packet, such as encapsulate/decapsulate, encrypt/decrypt, add/remove headers, aggregate/split, schedule packets and queues, etc., perform operations relating to a state of the packet, such as save/update metadata, change internal or system configurations to handle packet processing, query/use stored metadata, query/use current or historical state of network interface device or system, request/schedule network interface device and system-level state changes (e.g., pre-load caches, load FPGA code in either on-network interface device FPGA or server architecture FPGA, or both, etc.).

A memory 110 in network interface device 200 may be used to act as a storage space set aside for storing packet queues received from the server architecture 103 or from the network 179. Memory 110 can be any type of volatile or non-volatile memory device, such as one or more buffers, and can store any queue or instructions used to program network interface of network interface device 100.

As packets are received by the controller, they may be parsed and stored in the packet buffer. The controller 101 may inspect the contents of the incoming packet using packet inspection mechanisms, for example, using a TCP Offload Engine (TOE) and corresponding features. Looking up the layers in the packet's encapsulation, the controller 101 may be able to determine the Source/Destination, Traffic-handling and meta-data markings, application, or even the data contents. The packet inspection does not have to be deep packet inspection. It could be as simple as looking at the source address/port number/other header information and knowing that all traffic from this source address/port number/header information needs to be processed using a particular program or processing element, and may correspond to a given workload/process/instruction to be executed.

Information obtained during the process of packet analysis may be stored in a metadata database, for example in the network interface device's memory 110. The metadata database may store various metadata about a packet or group of packets. For example, the metadata database may include a service associated with the workload corresponding to the data packet, number of received packets of certain type, a program needed to process the packet or similar packets, a virtual machine needed to process the packet or similar packets, an FPGA program to process the packet or similar packets, a statistical profile of the packet or similar packets, and the like. The metadata database may be used by the controller 101 to manage coordination, scheduling, loading, and unloading of host queues (e.g., queues including control signals and/or data signals from the host) and/or network queues (e.g., queues including control signals and/or data signals from the network). The metadata database may further be used by the controller 101 in order to manage data routing operations to route data to a selected/determined physical location of a cache in the server architecture 160.

The controller 101 may implement coordinated scheduling of host or network queues. The coordinated scheduling is in order to determine proper scheduling decisions.

Figure 2:
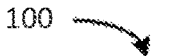
FIG. 2 depicts in schematic form an example architecture for the network interface device of FIG. 1.
Figure 2:
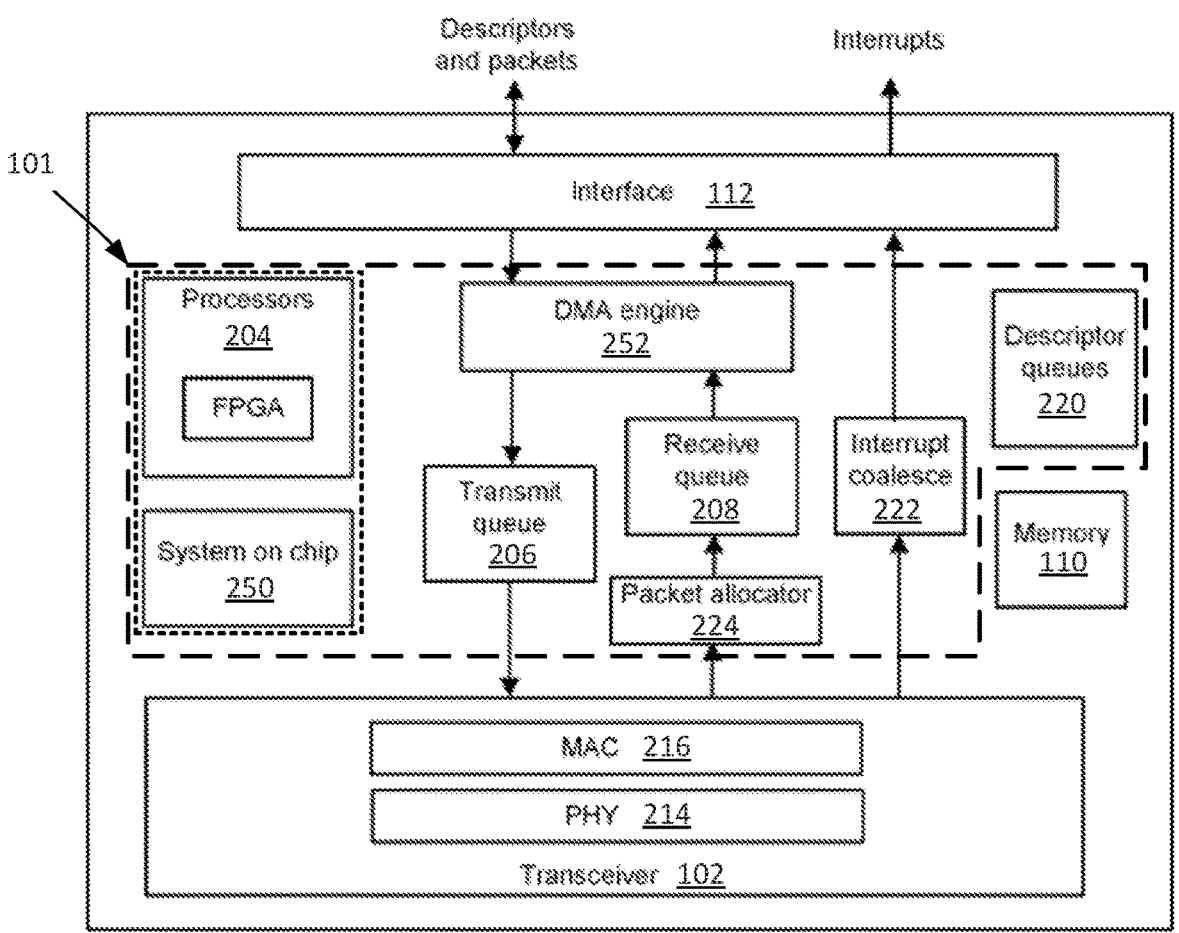

FIG. 2 depicts an example network interface device according to some embodiments, such as an network interface device, similar to network interface device 100 of FIG. 1. In some examples, network interface device 100 can be implemented as a network interface controller (NIC), network interface card, a host fabric interface (HFI), or host bus adapter (HBA), and such examples can be interchangeable. Network interface device 100 can be coupled to one or more servers using a bus, PCIe, CXL, or DDR. Network interface device 100 may be embodied as part of a system-on-a-chip (SoC) that includes one or more processors, or included on a multichip package that also contains one or more processors.

Some examples of network interface device 100, similar to that of FIG. 1, may be part an IPU or data processing unit (DPU) or utilized by an network interface device or DPU. An xPU can refer at least to an network interface device, IPU, DPU, GPU, GPGPU, or other processing units (e.g., accelerator devices). An network interface device in the form of an xPU can include a network interface with one or more programmable or fixed function processors to perform offload of operations that could have been performed by a CPU. The network interface device can include one or more memory devices. In some examples, the network interface device can perform virtual switch operations, manage storage transactions (e.g., compression, cryptography, virtualization), and manage operations performed on other network interface devices, servers, or devices.

Network interface device 100 can include transceiver 102, transmit queue 206, receive queue 208, memory 110, and bus interface 112, and DMA engine circuitry 252. The DMA engine 252, transmit queue 206, receive queue 208, interrupt coalesce 222, packet allocator circuitry 224 and descriptor queues 220 may be part of a controller 101, similar to example to controller 101 of FIG. 2. If the network interface device is an xPU, it may further include a processor 204 and SoC 250 shown inside dotted lines in the figure.

A descriptor provide information on a packet, such as the source and target memory addresses of the packet and the length of the packet in memory. A descriptor, once posted to a DMA engine (e.g., DMA engine 252) of a network interface device 160, will trigger the DMA engine to generate a DMA request to fetch the packet from an external memory.

Transceiver 102 can be capable of receiving and transmitting packets in conformance with the applicable protocols such as Ethernet as described in IEEE 802.3, although other protocols may be used. Transceiver 102 can receive and transmit packets from and to a network via a network medium (not depicted). Transceiver 102 can include PHY circuitry 214 and media access control (MAC) circuitry 216. PHY circuitry 214 can include encoding and decoding circuitry (not shown) to encode and decode data packets according to applicable physical layer specifications or standards. MAC circuitry 216 can be configured to assemble data to be transmitted into packets, which include destination and source addresses along with network control information and error detection hash values.

Processors 204 can be any a combination of a: processor, core, graphics processing unit (GPU), field programmable gate array (FPGA), application specific integrated circuit (ASIC), or other programmable hardware device that allow programming of network interface of network interface device 100. For example, a "smart network interface" can provide packet processing capabilities in the network interface using processors 204.

Processors 204 can include one or more packet processing pipeline that can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines can perform one or more of: packet parsing (parser), exact match-action (e.g., small exact match (SEM) engine or a large exact match (LEM)), wildcard match-action (WCM), longest prefix match block (LPM), a hash block (e.g., receive side scaling (RSS)), a packet modifier (modifier), or traffic manager (e.g., transmit rate metering or shaping). For example, packet processing pipelines can implement access control list (ACL), or packet drops due to queue overflow.

Configuration of operation of processors 204, including its data plane, can be programmed using Programming Protocol-independent Packet Processors (P4), C, Python, Broadcom Network Programming Language (NPL), Infrastructure Programmer Development Kit (IPDK), or x86 compatible executable binaries or other executable binaries. Processors 204 and/or system on chip 250 can execute instructions to configure and utilize one or more circuitry as well as check against violation against use configurations, as described herein.

Packet allocator circuitry 224 can provide distribution of received packets for processing by multiple computing units, such as CPUs 0 to 7 of FIG. 2, or cores, and can do so using packet data allocation to various cache physical locations on the server, such as FIG. 2. When packet allocator circuitry 224 uses RSS, packet allocator circuitry 224 can calculate a hash or make another determination based on contents of a received packet to determine which CPU or core is to process a packet. The latter provides one example of implementation regarding allocation of a packet to a CPU, but also, additionally and in a related manner, to an embodiment where the packet allocator circuitry 224 is adapted to manage data routing operations by selecting cache physical locations for the storage of packet data according to an embodiment. Packet allocator circuitry 224 could, in one embodiment, be included within processors 204, or it could be separate from it.

Interrupt coalesce circuitry 222 can perform interrupt moderation whereby network interface interrupt coalesce circuitry 222 waits for multiple packets to arrive, or for a time-out to expire, before generating an interrupt to host system to process received packet(s). Receive Segment Coalescing (RSC) can be performed by network interface of network interface device 100 whereby portions of incoming packets are combined into segments of a packet. Network interface 100 provides this coalesced packet to an application.

Direct memory access (DMA) engine circuitry 252 is configured to copy a packet header, packet payload, and/or descriptor directly from host memory to the network interface device or vice versa, instead of copying the packet information to an intermediate buffer at the host and then using another copy operation from the intermediate buffer to the destination buffer, hence the "direct" in direct memory access.

Transmit queue 206 can include data or references to data for transmission by network interface of network interface device 100. Receive queue 208 can include data or references to data that was received by network interface of network interface device 100 from a network. Descriptor queues 220 can include descriptors that reference data or packets in transmit queue 206 or receive queue 208. Bus interface 112 can provide an interface with a server For example, bus interface 112 can be compatible with at least one of Peripheral Component Interconnect (PCI), PCI express (PCIe), PCIx, Universal Chiplet Interconnect Express (UCIe), Intel On-chip System Fabric (IOSF), Gen-Z, Open Coherent Accelerator Processor Interface (Open-CAPI), and/or Compute Express Link (CXL), Serial ATA, and/or USB compatible interface (although other interconnection standards may be used).

Figure 3:
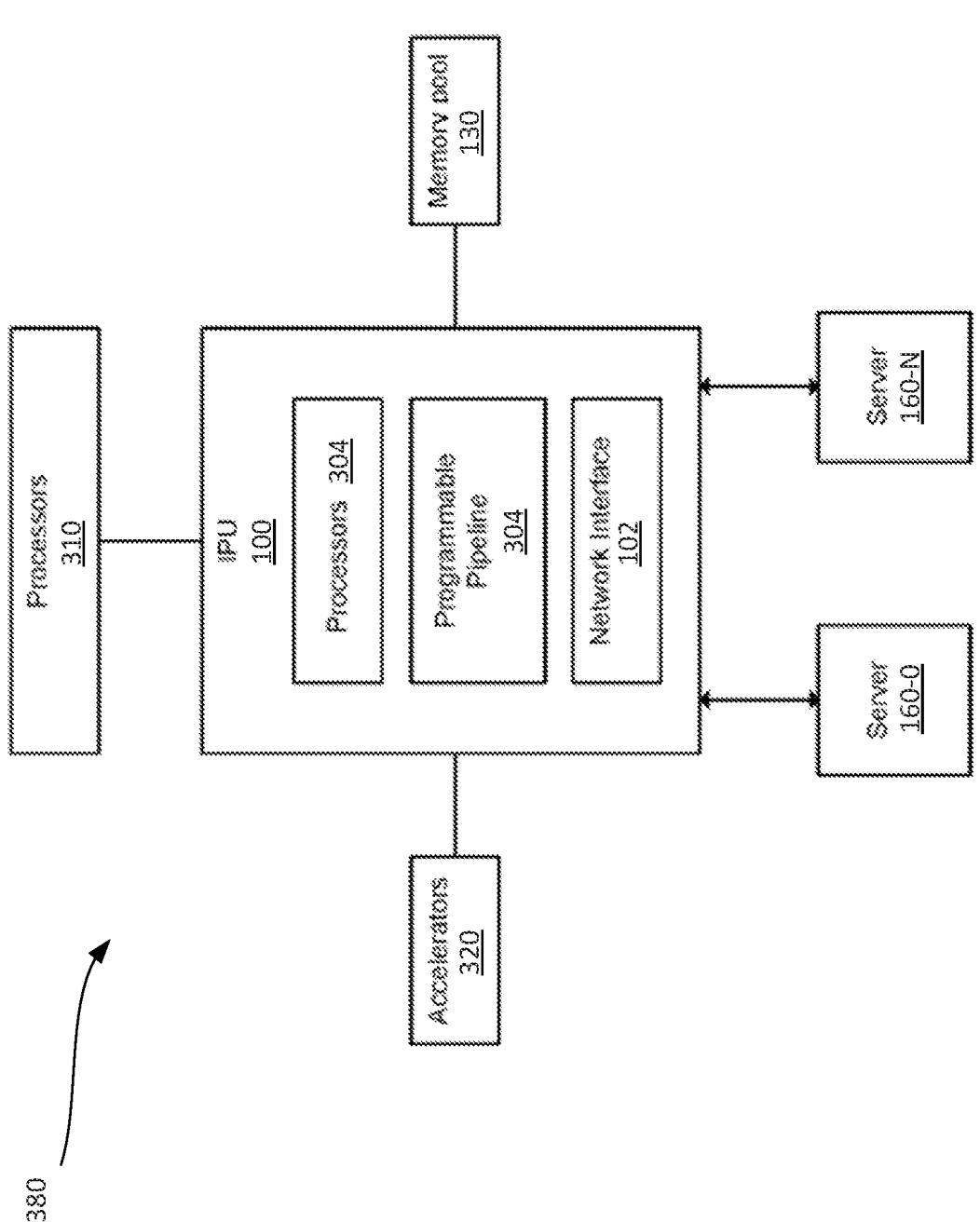
FIG. 3 depicts in schematic form another example computing system including a network interface device according to an embodiment.

FIG. 3 depicts an example network interface device in the form of an IPU 380 that may be used to implement some embodiments. In this system, network interface device 100 manages performance of one or more processes using one or more of processors 104, processors 310, accelerators 320, memory pool 130, or servers 340-0 to 340-N, where N is an integer of 1 or more. In some examples, processors 104 of network interface device 100 can execute one or more processes, applications, VMs, containers, microservices, and so forth that request performance of workloads by one or more of: processors 310, accelerators 320, memory pool 130, and/or servers 340-0 to 340-N. network interface device 100 can utilize network interface 102 or one or more device interfaces to communicate with processors 310, accelerators 320, memory pool 130, and/or servers 340-0 to 340-N. network interface device 100 can utilize programmable pipeline 304 to process packets that are to be transmitted from network interface 102 or packets received from network interface 102.

In some examples, configuration of programmable pipelines 304 can be programmed using a processor of processors 104 and operation of programmable pipelines 304 can continue during updates to software executing on the processor, or other unavailability of the processor, as a second processor of processors 104 provides connectivity to a host such as one or more of servers 160-0 to 160-N and the second processor can configure operation of programmable pipelines 304.

Figure 4:
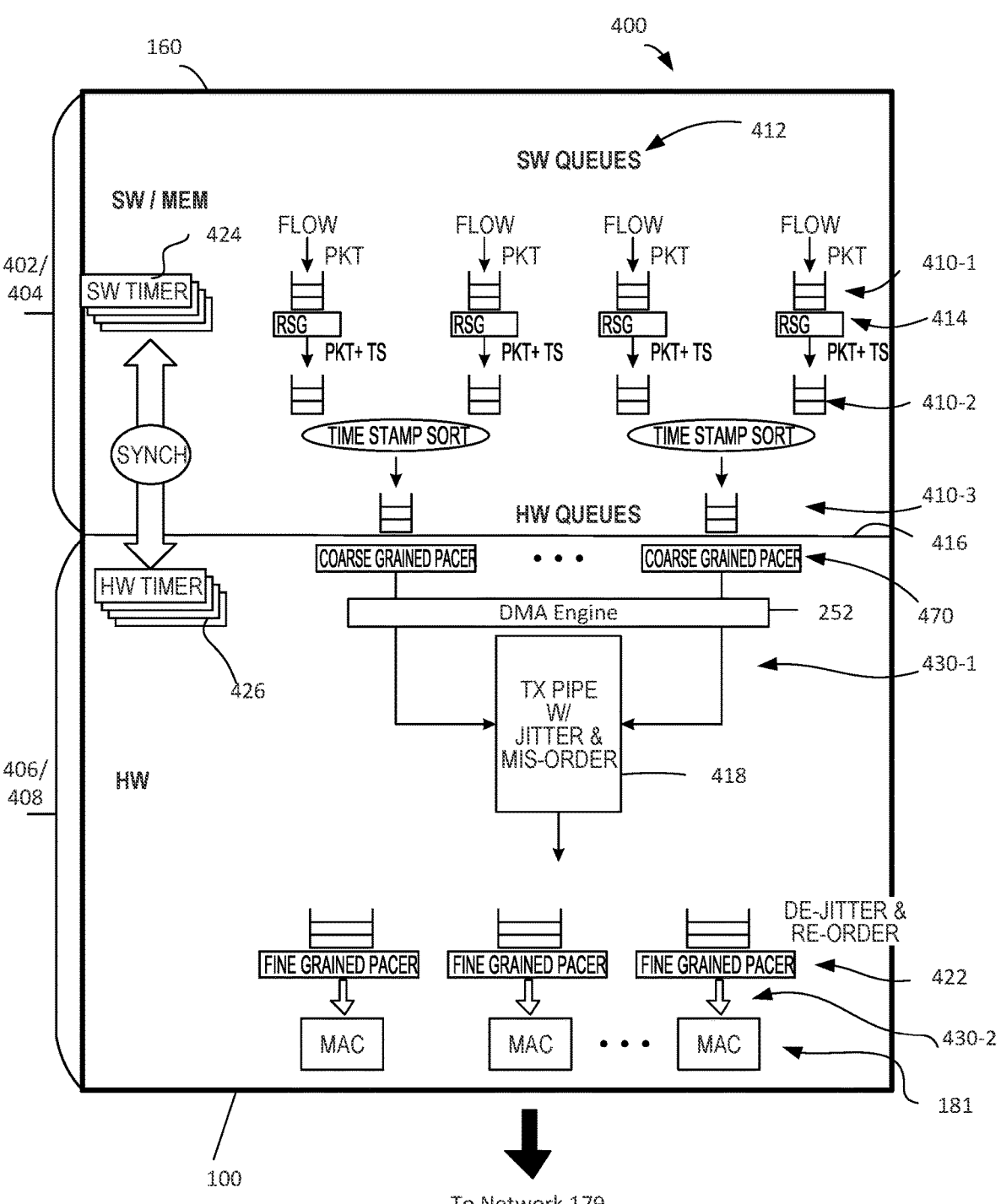
FIG. 4 depicts a time flow diagram from SW to HW in a computing network according to a first embodiment.

FIG. 4 is a block diagram of an exemplary processor core 104 to execute computer-executable instructions as part of implementing technologies described herein. The processor core 104 can be a core for any type of processor, such as a microprocessor, an embedded processor, a digital signal processor (DSP) or a network processor. The processor core 104 can be a single-threaded core or a multithreaded core in that it may include more than one hardware thread context (or "logical processor") per core.

FIG. 4 also illustrates a memory 410 coupled to the processor core 400. The memory 410 can be any memory described herein or any other memory known to those of skill in the art. The memory 410 can store computer-executable instruction 415 (code) executable by the processor core 104.

The processor core comprises front-end logic 320 that receives instructions from the memory 310. An instruction can be processed by one or more decoders 330. The decoder 330 can generate as its output a micro operation such as a fixed width micro operation in a predefined format, or generate other instructions, microinstructions, or control signals, which reflect the original code instruction. The front-end logic 320 further comprises register renaming logic 335 and scheduling logic 340, which generally allocate resources and queues operations corresponding to converting an instruction for execution.

The processor core 300 further comprises execution logic 350, which comprises one or more execution units (EUs) 365-1 through 365-N. Some processor core embodiments can include a number of execution units dedicated to specific functions or sets of functions. Other embodiments can include only one execution unit or one execution unit that can perform a particular function. The execution logic 350 performs the operations specified by code instructions. After completion of execution of the operations specified by the code instructions, back-end logic 370 retires instructions using retirement logic 375. In some embodiments, the processor core 104 allows out of order execution but requires in-order retirement of instructions. Retirement logic 370 can take a variety of forms as known to those of skill in the art (e.g., re-order buffers or the like).

Although not illustrated in FIG. 4, a processor can include other elements on an integrated chip with the processor core 300. For example, a processor may include additional elements such as memory control logic, one or more graphics engines, I/O control logic and/or one or more caches.

Embodiments include within their scope an apparatus of a server architecture of a computing network, the computing network including a host memory and a network interface device, the apparatus including one or more processors to generate a message including a timestamp based on a time at which the network interface device is to fetch, from a host memory, one or more data packet descriptors that correspond to the timestamp, and send the message for transmission to the network interface device.

Embodiments include within their scope an apparatus of a network interface device of a computing network, the computing network including a host memory and a server architecture, the apparatus including one or more processors to access a message from the server architecture, the message including a timestamp based on a time at which the network interface device is to fetch from a host memory one or more data packet descriptors that correspond to the timestamp; and send for transmission to the server architecture a request to access the host memory to fetch the one or more data packet descriptors therefrom, the request to access based on the timestamp.

Example embodiments will now be described more particularly in the context of FIGS. 5-8 below.

FIG. 4 shows a computing environment 400 that depicts the flow of control signal queues between SW 402 on the server side 404 and HW 406 on the network interface device side 408. When referring to the operations in FIG. 4, reference will sometimes be made to components of FIGS. 1 and 2 to establish further context with respect to an example architecture that may be used to implement the embodiment of FIG. 4.

SW 402 may be implemented for example in any network interface device (e.g., network interface device 100 of FIG. 1) of a computing network, such as a NIC or an IPU of a data center, or of a content delivery network (CDN). In addition, HW 406 may be implemented in any computing node, such as a server architecture (e.g., server architecture 160 of FIG. 1) that includes one or more computing units, and that is a computing node of a computing network (e.g., CPUs 1-7 of FIG. 1). The HW 406 may be of a data center and/or of a CDN. According to some embodiments, a server architecture may have more bandwidth than one or more of its client devices.

SW control queues 412 start at the SW in the form of flows of control queues 410-1 that are individually rate stamped by rate stamp generators (RSGs) 414. Control queues 410-1 may include control information, such as, for example, respective doorbells (DBs) including pointers to corresponding descriptors of data packets to be subsequently fetched via DMA requests from the host memory 130. The data packets may be for ultimate transmission by the network interface device 160 to the network 179. A DB in general includes control information to signal to the network interface device that the network interface device is to execute one or more operations based on the information, such as descriptors, within the DB. The pointers in the DB may point to addresses, in host memory, of descriptors of the data packets to be transmitted.

A descriptor may in general include metadata regarding a packet, such as information on attributes of a packet, including a pointer or reference to an address of the packet within a memory, such as a host memory.

DBs 410-1 according to some embodiments includes a data structure in the form of pointers a plurality of descriptor packets for the data packets to be ultimately transmitted. The plurality of descriptor packets themselves may, after being DMA fetched, be in the form of another (second type of) DB in the form of a descriptor queue of descriptor packets for data packets to be eventually transmitted to the network. More on the data structure of the second kind of doorbell will be provided below in the context of FIG. 5B.

According to an embodiment, a DB may in general include a fixed number of slots, with each slot having a same size. A control queue 410-1 as shown in FIG. 4 may include a DB that comprises pointers to descriptors of data packets (data packet descriptor pointers), which data packets are to be later fetched at the host memory 130. The DB in the form of control queue 410-1 thus includes as many data packet descriptor pointer DBs (each pointer representing its own individual DB) as there are data packets to be ultimately fetched for transmission to the network.

Referring still to FIG. 4, SW RSGs 414 may for example check to ensure that the control queues 410-1 match one or more traffic contracts or traffic policies at the SW 402. RSGs 414 may allow the individual control queues to pass, or drop the control queues based on whether they conform to, exceed or violate the one or more traffic contracts.

According to some embodiments, the SW 402 may determine one or more timestamps for individual ones of the control queues 410-1. Let us suppose individual ones of the control queues 410-1 are associated with a plurality of timestamps. The timestamps to be associated with a control queue 410-1 may each correspond to one of the data packets the descriptor pointers of which are included in control queue 410-1 as described above. RSGs 414 may generate timestamp (TS) descriptor queues 410-2 (or control queues 410-2) using the timestamps determined by the SW 402. Each TS descriptor queue as suggested in FIG. 4 includes: (1) timestamps on a per data packet basis; and (2) the content of its corresponding control queue 410-1, namely, data packet descriptor pointers of the corresponding control queue 410-1 (data packet descriptor pointer DBs). A given timestamp within a TS descriptor queue may correspond to a time at which the HW is to fetch, from host memory 130, the data packet descriptors of a given data packet corresponding to that given timestamp, the fetching based on a data packet descriptor pointer for that given data packet in the corresponding control queue 410-1. Thus, each TS descriptor queue may include one or more timestamps, and the corresponding data packet descriptor pointer DB, which general DB itself includes individual DBs corresponding to each data packet descriptor pointer. Fetching the data packet descriptors will ultimately lead to fetching the data packets themselves, all triggered by the initial expiration of corresponding timestamps provided in the TS descriptor queue.

A timestamp may thus be determined based on a time of transmission from the network interface device 100 to the network 179 of one or more data packets that correspond to the timestamp. These data packets are thus to be fetched by the network interface device 100 based on the TS descriptor queues. The time of transmission of the data packets may be based on QoS requirements of the one or more data packets. The timestamp may further be based on jitter, which itself is based on the time of transmission of the packet for which the timestamp is to be determined, and/or on the time of transmission of a group of packets to be transmitted.

SW 402 may sort the TS descriptor queues 410-2, for example as shown by multiplexing (MUX'ing) them into muxed TS descriptor queues 410-3. The content of TS descriptor queues 410-3 may thus merely correspond to the content of a number of TS descriptor queues 410-2 muxed together. TS descriptor queues 410-3 include timestamp information, and are sent by the SW 402 to the HW 406. Thus, TS descriptor queues 410-3 correspond to HW TS descriptor queues, as they are passed across the SW/HW interface 416. More details on TS descriptor queues 410-3 will be provided in the example of FIG. 5B. The HW accumulates the HW TS descriptor queues on its local storage, such as within a buffer. If the local storage is full, the HW may discard certain TS descriptor queues, for example after a selection process. When all TS descriptors up to a last TS DB within a queue have been fetched and local storage has room, a next TS descriptor queue may be fetched by the HW from the SW and stored in the HW's local storage, such as one or more buffers.

The HW queues therefore contain monotonically increasing timestamps per data packet, although the jitter between consecutive packets may vary as they correspond to multiple packet flows with different rates. There may be, by way of example, about 2,000 to about 16,000 TS descriptor queues 410-3 to be sent across the HW/SW interface 416 at a given time.

The SW/HW interface may, on the SW side, include a server interface such as server interface 183, and on the HW side, include a host interface such as host interface 112. The TS descriptor queues 410-3 are routed into a TS memory in the form of course grained pacers 420 at the HW 406. The course grained pacers 420 may include memory such as a first in first out (FIFO) storage or memory, corresponding for example to part of a descriptor ring (the part that pertains to monitoring queue heads) that is managed by HW 406. The TS memory of the course grained pacers 420 at the HW may store TS descriptor queues 410-3 until expiration of individual timestamps therein. The TS memory of the course grained pacers 420 may correspond, for example, to the buffers 210 of FIG. 2. When a timestamp expires is when the HW 406 may trigger a read request, for example a DMA fetch, to fetch the corresponding data packet descriptor(s) the pointer(s) for which can be accessed in the corresponding data packet descriptor pointer DB. A course grained pacers 420 is not to post the corresponding data packet descriptor pointer DB to trigger a DMA fetch of the data packet descriptor(s) until the timestamp that corresponds to those data packet descriptor pointers has expired. The data packet descriptor pointer DB for which the timestamp has expired may, according to an example, not be delayed in its posting to the DMA engine 252 for DMA request generation beyond a configured pacing window. Where a data packet descriptor DB for which the timestamp has expired is delayed beyond the configured pacing window, according to an example, the course grained pacer 420 in question may drop the DB and hence the transmission of the data packets that correspond to the same.

Referring still to FIG. 4, upon expiration of a given timestamp in a TS descriptor queue 410-3, a course grained pacer 420 may update/increment, in its descriptor ring, the head pointer of the TS descriptor queue that included the mentioned expired timestamp. The course grained pacer 420 then posts the data packet descriptor pointer DB to DMA engine 252. Upon receipt of a data packet descriptor pointer DB, the DMA engine may initiate a DMA fetch for the data packet descriptor(s) of the data packet that is to be eventually transmitted to the network 179. The coarse grained pacer at the top of the TX pipe 418 may be coarse, for example to the level of the jitter that is introduced by the later TX pipe. The jitter may be caused by a number of factors, including current pipe states in the TX pipe 418, and a search by the TX pipe for filters for various ones of the TX packet flows.

The provision of one or more coarse grained pacers 470 (in HW or SW) on the HW 406 is scalable with the number of incoming queues, such as TS descriptor queues, and relatively inexpensive with respect to die size metrics, especially when low-granularity timestamps are used (e.g., per data packet descriptor).

The DMA request to fetch the data packet descriptor(s) for which a timestamp may cause the receipt by HW 406 of the data packet descriptor(s). The data packet descriptors may again be routed to the DMA engine 252, which would generate and cause HW 406 to send a DMA request to fetch the data packet corresponding to the data packet descriptor (s) that were received. The latter in turn may cause the receipt by HW 406 of the data packet. Multiple such data packets are shown in FIG. 4 as being received for routing by the HW 406. Those data packets 430-1 are then routed to the TX pipe 418. The data packets 430-1 may exhibit jitter and mis-order by virtue of the pacing of the DMA data packet fetches brought about by the coarse grained pacers. The mis-order denotes the potential out of order nature of received data packets 430-1. The number of data packets within data packets 430-1 is in part of function of the number of computing units of the server architecture. Not all data packets will be DMA fetched in the order in which they were sent by the server architecture as a result of the DMA data packet fetch.

The TX pipe 418 may then route the data packets 430-1 to fine grained pacers 422, which are to de-fitter and re-order the data packets. The fine tuning is to mitigate noise from the TX pipe 418. The fine-tuned data packets 430-2 are then routed to the various Medium Access Control engines in the network interface 181 of the network interface device for transmission to the network 179.

The fine grained pacers 422 at the end of the TX pipe 418 provides precise granularity and reordering functionality to fix jitter and mis-order created (a) in the TX pipe and (b) caused by the coarse-grained pacing stage, as noted previously. A buffer at the fine grained pacer 422 may be proportional to the jitter and mis-order window, which may be fairly small. The exact buffer size is a function of TXT pipe implementation details, such as its depth, coarse-grained pacing stage graining, and hash tables' inquiries.

SW 402 has a SW timer 424, and HW 406 has a HW timer 426. Both SW timer 424 and HW timer 426 must have a common system reference clock that is used for both time-stamping on the SW side, and the shaping of packet queues on the HW side. Thus, the SW timer 424 is to be synchronized to its corresponding HW timer, as shown in FIG. 4. The above may be accomplished using, for example, a Precise Time Measurement PCIe capability.

Precision Time Measurement (PTM) enables precise coordination of events across multiple components with independent local time clocks. PTM enables components to calculate the relationship between their local times and a shared PTM Master Time: an independent time domain associated with a PTM Root. Each PTM Root supplies PTM Master Time for a PTM Hierarchy.

When several queues, such as DBs or data packet queues, are eligible for transmission (e.g., which may include posting from one engine of the HW 406 to another engine of the HW 406, or which may include transmission from the HW 406) simultaneously, inter-queue arbitration (e.g., Round Robin) may be applied according to one example.

Some embodiments advantageously take advantage of pacing the fetching of data packet descriptors at the top of the TX pipe of a network interface device, in this way allowing relatively small states and minimize storage requirements at the network interface device. Additional jitter the pacing and the TX pipe may introduce due to later DMA operation for fetching data and descriptors and further packet processing (e.g., in advanced NICs) may be mitigate through de-jittering at the fine grained pacer stage, which may include reorder jitter compensation buffers followed by a pacer located on the interface to the network. A required capacity of a reordering buffer may advantageously be significantly smaller than that required by existing approaches. The fine grained pacers may provide a highest granularity following high precision timestamp information provided in a packet DMA stage.

Figures 5A, 5B:
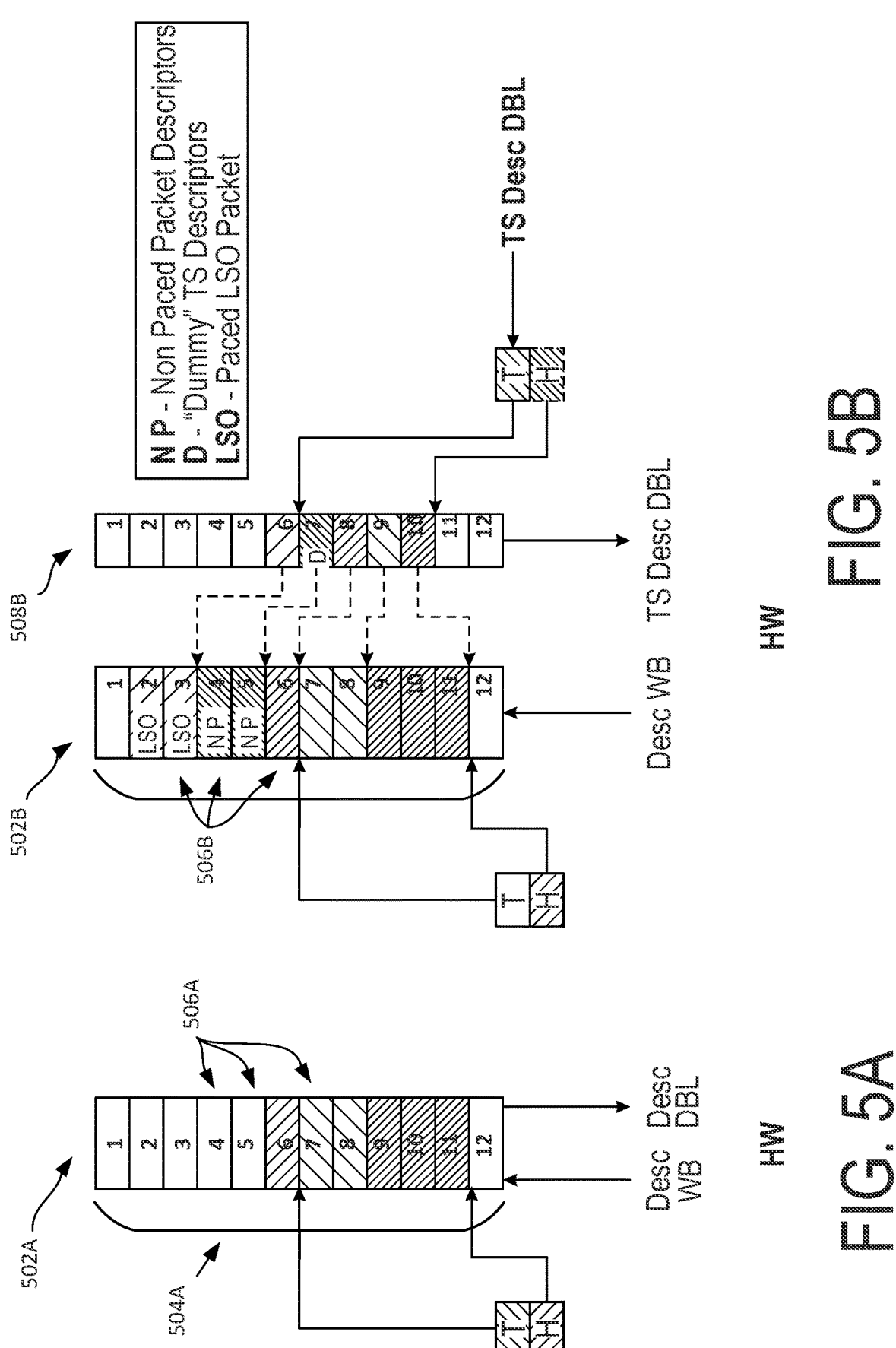
FIGS. 5A and 5B depict data structures for doorbell (DB) queues and writebacks (WBs) according to various embodiments.

Reference is now made to FIGS. 5A and 5B, which respectively show a data packet descriptor queue according to the state of the art, and a TS descriptor queue with its data packet descriptor queue according to some embodiments.

FIG. 5A shows a legacy data packet descriptor queue or DB 502A. Queue 502A correspond to a DB to the HW 406 to DMA fetch data packets for which descriptors are provided in the DB. DB 502A includes a data structure 504A including a number 12 of descriptor slots 506A, individual slots being of a same size, e.g., 32 bytes or 64 bytes, or another number of bytes, each slot corresponding to a space in terms of bits or bytes for a descriptor. FIG. 5A shows descriptors provided in slots for a total of three packets, with each packet denoted by a different shading in FIG. 5A within descriptor slots 506A. Slot 6 is for a descriptor for data packet A, slots 7 and 8 for descriptors for data packet B, and slots 9, 10, and 11 for descriptors for data packet C. A data packet may thus have one or more descriptors in a DB. The DB 502A is shown as having a head pointer H, and a tail pointer T, with the head pointer being managed by HW 406, and the tail pointer being managed by SW 402. Once the HW 406 finishes (e.g., by accessing and/or storing in a buffer) with a given data packet descriptor, it may increment the head pointer to the next descriptor start line, and the SW may similarly increment the tail pointer to its next position.

When the legacy DB arrives at a network interface device of the state of the art, a scheduler of the network interface device will route the DB to the DMA engine of the network interface device, which will then fetch the data packets from host memory for transmission based on the addresses of the data packets provided by the descriptors in DB 502A.

The disadvantages of the state of the art have already been described above, note the least of them is that the network interface device buffers may not have enough capacity to buffer the incoming data packets in this way resulting in a large number of data packet drops and missed transmissions.

FIG. 5B shows a data packet descriptor queue or DB 502B, which is comparable to that of FIG. 5A. Queue 502B correspond to a DB to the HW 406 to DMA fetch data packets for which descriptors are provided in the DB. DB 502B includes a data structure 504B including a number N of descriptor slots 506B, individual slots being of a same size, e.g., 32 bytes or 64 bytes, or another number of bytes, each slot corresponding to a space, such as in bits or bytes, for a descriptor. FIG. 5B shows descriptors provided in slots for a total of five packets, with each packet denoted by a different shading within descriptor slots 506B. Slots 2 and 3 correspond to descriptors for data packet LSO, a paced large send offload data packet. Slots 4 and 5 correspond to descriptors for a non-paced data packet NP. Slot 6 corresponds to a descriptor for a paced data packet X. Slots 7 and 8 corresponds to descriptors for a paced data packet Y. Slots 9, 10 and 11 correspond to descriptors for paced data packet Z. A data packet may thus have one or more descriptors in a DB. The DB 502B is shown as having a head pointer H, and a tail pointer T, with the head pointer being managed by HW 406, and the tail pointer being managed by SW 402.

FIG. 5B further shows a TS descriptor queue 508B according to an embodiment. The TS descriptor queue 508B may correspond for example to TS descriptor queues 410-3 as described in detail in FIG. 4. TS descriptor queue 508B includes a number of slots 12 matching the number of slots 12 of the data packet descriptor queue 502B. The size matching of the slots as between the TS descriptor queue and the data packet descriptor queue is so that every data packet that could be represented in the data packet descriptor queue could have a corresponding timestamp in a slot within the TS descriptor queue. According to an embodiment TS descriptor queue 508B may have a single entry per data packet, while a normal/legacy descriptor queue can have one or more descriptors per packet, as clearly shown in FIG. 5B.

Each occupied slot (slots 6 through 10 in the shown example of FIG. 5B) of the TS descriptor queue 508B may include a timestamp, and a pointer, for the corresponding data packet of that occupied slot, to the corresponding data packet's data packet descriptors in data packet descriptor queue 502B. Thus, as suggested previously in the context of FIG. 4, a TS descriptor queue includes: (1) a timestamp corresponding to a data packet; and (2) a data packet descriptor pointer to the descriptor(s) of that data packet contained in a data packet descriptor queue.

The timestamp of the TS descriptor queue may correspond to a coarse grain time stamp, while the fine grain timestamp that is used at the fine grained pacers (see fine grained pacers 422 for examples in FIG. 4) may be provided by a legacy descriptor and within the HW after the packet is actually paced, scheduled, and injected into the TX pipeline and its descriptors are fetched before the packet is inserted into a fine grained pacer.

According to an embodiment, coarse grain pacing may take into account a maximum or an average TX pipe latency in order for the paced packets to arrive at the fine grain pacer with enough time to guarantee a given time stamp is not violated, and not too early, in order to minimize the buffer size on the HW side.

Referring still to FIG. 5B, therefore, in TS descriptor queue 508B, slot 6 includes a timestamp and a pointer to the data packet descriptors occupying slots 2 and 3 of the data packet descriptor queue 502B, which data packet descriptors pertain to a paced LSO packet to be fetched. Slot 7 includes a dummy timestamp entry (such as an entry, but not corresponding to a timestamp) and a pointer to the data packet descriptors occupying slots 4 and 5 of the data packet descriptor queue 502B, which data packet descriptors correspond to a non-paced data packet (i.e., a data packet the transmission of which is not subject to a timestamp according to embodiments). According to an embodiment, a non-paced packet will not be delayed by the HW coarse pacer, but since it will be transmitted in its order in the HW queue it will be delayed be paced previous packets. Slot 8 includes a timestamp and a pointer to the data packet descriptor occupying slot 6 f the data packet descriptor queue 502B, which data packet descriptor pertain to a paced data packet X to be fetched. Slot 9 includes a timestamp and a pointer to the data packet descriptors occupying slots 7 and 8 of the data packet descriptor queue 502B, which data packet descriptor pertain to a paced data packet Y to be fetched. Slot 10 includes a timestamp and a pointer to the data packet descriptors occupying slots 9, 10 and 11 of the data packet descriptor queue 502B, which data packet descriptor pertain to a paced data packet Y to be fetched. The timestamp values of a TS descriptor queue may partially overlap with each other, fully overlap with each other, or not overlap with each other at all (i.e., all be distinct from one another). According to an embodiment, each queue may have its TS granularity configured, for example allowing a 128 ns granularity queue as well as Bus pacing queue to coexist. While a 19TS with 128 ns granularity covers a range of x ns, 19TS in Bus granularity covers a range of 64x ns. Both ranges/granularities for different applications, according to an embodiment, may coexist on HW.

According to some embodiments, the HW may store one or more TS descriptor queues in a buffer or TS descriptor ring, and fetch the information for those queues from the TS descriptor ring. According to an embodiment, the HW may always prefetch N TS descriptors (each represent a single packet) from TS Descriptor Queue Head and store them on a N size buffer. As a prefetch operation takes time (PCIe Read from Host memory latency), SW may need to provide the TS descriptor with enough lead time (unless we use the 64b TS DBL that contains the TS descriptor info in it). HW may need to prefetch enough TS descriptors in advance to cover for prefetch latency and store them on a temporary FIFO buffer per TS queue. HW may further include a TS Descriptor Merge logic, which may be executed before a fetched TS descriptor is written into the local FIFO buffer. There, the HW may compare its timestamp to the one last of the FIFO, and, if the timestamp gap is smaller than the pacing granularity, the HW may merge them to a single TS descriptor on the FIFO buffer that will have the DBL value of the latest TS descriptor merged.

Figure 6:
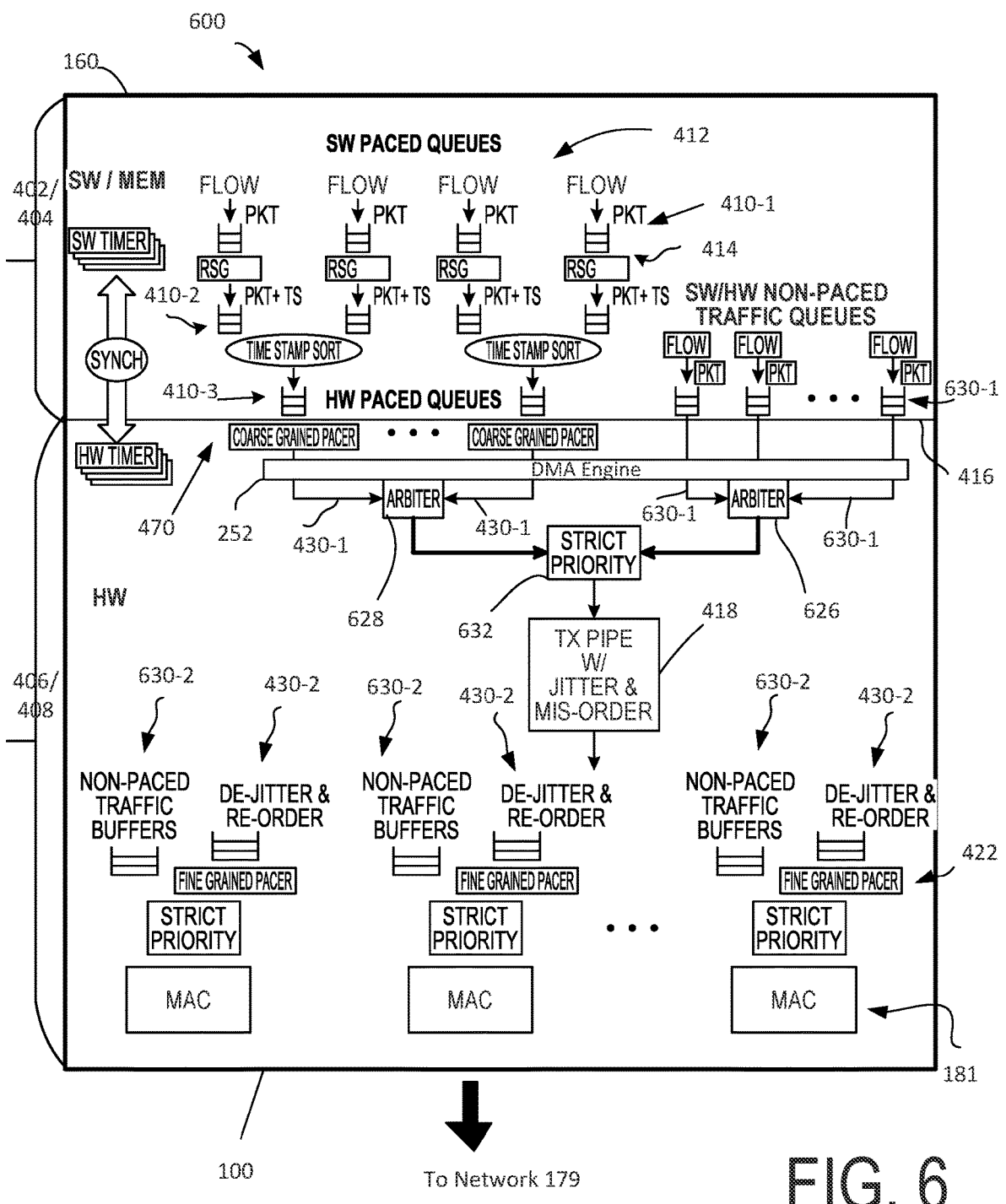
FIG. 6 depicts a time flow diagram from SW to HW in a computing network according to a second embodiment.

Reference is now made to FIG. 6, which is a computing environment 700 similar to that of FIG. 4 already described in detail above, plus additional flows and functionality relating to the shaping and routing of non-paced traffic queues according to an embodiment. For the latter reason, same elements as between FIGS. 7 and 5 have been indicated with the same reference numerals and will not be described again in the context of FIG. 6.

FIG. 6 illustrates an embodiment of a manner in which legacy non-paced data packet flows may be treated in conjunction with paced data packet flows as described above in the context of some embodiments.

SW 402 of FIG. 6, in addition to the functionality already described above in relation to FIG. 4, may route non-paced traffic queues to HW 406. The non-paced traffic 730-1 includes non-paced data packet traffic in the form of various flows as shown. These are, based on legacy flows, sent through the SW/HW interface 416 to be shaped and routed by HW 406. The non-paced data packet traffic 730-1 may have been fetched by HW 406 as a result of a DMA fetch (e.g., one or more DMA fetches) by the DMA engine 252). The non-paced data packets 730-1 are then routed at the HW 406 to an arbiter 726. Similarly, incoming data packets 430-1 from the paced data packet queues are routed to the HW to an arbiter 728. Arbiters 726 and 728 may for example deliver the different data packet queues 430-1 and 730-1 to a strict priority engine 732 according to any order, such as by using a round-robin approach.

Strict priority engine 732 may treat the paced data packets 430-1 based on strict priority above the non-paced data packets 730-1 in order to minimize additional jitter. Thus, the paced data packets may be assigned a strict priority by the strict priority engine. In this manner, at the fine grained pacers 422 may cause transmission of the paced data packets based on their assigned strict priorities.

The data packets 430-1 and 730-1 may be interleaved within the TX pipe 418 before being delivered to the MACs 181.

Paced and non-paced flows packets can, according to an embodiment, exist on the same TS queue. Non-paced packets on a TS queue may be scheduled in order behind the paced packet on the coarse grained pacing stage, although they may bypass the paced traffic on the fine grained pacing stage, as they may be inserted with the non-paced packets.

We will refer to the paced data packets emerging from the TX pipe 418 by reference numeral 430-2, and to the non-paced data packets emerging form the TX pipe 418 by reference numeral 730-1.

According to the shown embodiment, a non-paced packet 730-2 is to be transmitted during a time duration where there are no future paced data packets pending to transmit, based on strict priority. Otherwise, the non-paced data packets may not be transmitted even if the link is currently available. The above option for embodiments may imply a non-paced traffic livelock or starvation on certain scenarios. It is to be noted however that this issue is inherent when any possible strict departure time enforcement is introduced with respect to packet flows. In such situations the issue may be targeted at a system level. If the total paced traffic amount is reduced, then more BW is available for non-paced packet, and hence starvation probability is reduced or eliminated.

According to an option, some of the non-paced data packets may not be shaped or interleaved with paced data packets in the HW 406, and may not be delayed as described above with respect to the paced data packets in terms of their transmission to the network. Tx Time queue may contain flows that are not shaped interleaved with the shaped flows. Those unshaped flow packets that are not to be delayed may still be delayed by other paced flow packets that came before them in time, but may not be subject to the strict priority rules described above. For the unshaped data packets as described above, they may, according to an embodiment, correspond for example to non-paced data packets the descriptors for which are provided as NP in slots 4 and 5 of TS descriptor queue 502B of FIG. 5B, and the dummy timestamp D corresponding to which is provided in slot 7 of the TS doorbell 506B of FIG. 5B.

FIG. 7 depicts a process 800 to be performed at an apparatus of a network interface device according to some embodiments. The process 800 at operation 802 includes accessing a first message from a server architecture of the computing network, the first message including a timestamp based on a time at which the network interface device is to access, from the host memory, one or more data packet descriptors that correspond to a data packet to be transmitted to the computing network from the network interface device. The process 800 at operation 804 includes sending, for transmission to the server architecture and at a transmission time based on the timestamp, a second message, the second message including a request to access the one or more data packet descriptors. The process 800 at operation 806 includes, subsequent to sending the second message for transmission, accessing the one or more data packet descriptors to determine one or more addresses for the data packet in the host memory.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores," may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for another. For example, descriptions using the terms "connected" and/or "coupled" may indicate that two or more elements are in direct physical or electrical contact with another. The term "coupled," however, may also mean that two or more elements are not in direct contact with another, but yet still co-operate or interact with another.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. A component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes an apparatus of a server architecture of a computing network, the computing network including a host memory and a network interface device, the apparatus including one or more processors to: determine a first message including a timestamp based on a time at which the network interface device is to access, from the host memory, one or more data packet descriptors that correspond to a data packet to be transmitted to the computing network from the network interface device; send the first message for transmission to the network interface device; after sending the first message, receive, from the network interface device, a second message including a request to access the one or more data packet descriptors, the second message based on the timestamp; and in response to the second message, send the one or more data packet descriptors for transmission to the network interface device.

Example 2 includes the subject matter of Example 1, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

Example 3 includes the subject matter of Example 2, wherein the timestamp descriptor queue includes further includes, for respective ones of the plurality of timestamps, respective data packet descriptor pointers, the respective data packet descriptor pointers to provide corresponding references to the one or more data packet descriptors.

Example 4 includes the subject matter of Example 3, wherein the timestamp descriptor queue includes a plurality of slots of a same slot size, respective ones of the slots including a corresponding one of the plurality of timestamps, and a corresponding one of the data packet descriptor pointers.

Example 5 includes the subject matter of Example 1, the one or more processors to further: determine a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device; send the first messages for transmission to the network interface device; and receive, from the network interface device and based on the plurality of timestamps of respective ones of the first messages, second messages including requests to access data packet descriptors of data packets associated with the plurality of first messages; and send, for transmission to the network interface device, the data packet descriptors of the data packets associated with the plurality of first messages.

Example 6 includes the subject matter of Example 5, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

Example 7 includes the subject matter of Example 5, the one or more processors to further multiplex a plurality of the data packet descriptor pointers and a plurality of corresponding timestamps to determine the plurality of first messages.

Example 8 includes the subject matter of Example 2, the one or more processors to further: send, for transmission to the network interface device, a doorbell communication including tail information for the plurality of timestamps of the timestamp descriptor queue; and subsequent to sending the doorbell communication, send, for transmission to the network interface device, the timestamp descriptor queue.

Example 9 includes the subject matter of Example 2, the one or more processors to further: send, for transmission to the network interface device, a plurality of doorbell communications, individual ones of the doorbell communications including: tail information for a corresponding one of the plurality of timestamps of the timestamp descriptor queue; and a descriptor for the corresponding one of the plurality of timestamps; and subsequent to sending the plurality of doorbell communications, send, for transmission to the network interface device, the timestamp descriptor queue.

Example 10 includes the subject matter of Example 2, the one or more processors to send the data packet for transmission to the network interface device based on the timestamp.

Example 11 includes the subject matter of Example 10, wherein the data packet is a first data packet corresponding to a paced data packet based on the timestamp, the one or more processors to further send for transmission to the network interface device a second data packet corresponding to an unpaced data packet not based on a timestamp.

Example 12 includes the subject matter of Example 11, wherein the first message further includes one or more dummy timestamps distinct from the plurality of timestamps, and one or more corresponding data packet descriptors for unpaced data packets.

Example 13 includes the subject matter of any one of Examples 1-12, the one or more processors to further implement a synchronization of a timer of the server architecture with a timer of the network interface device.

Example 14 includes a server architecture of a computing network, the computing network including a host memory and a network interface device, the server architecture including a plurality of cache memory circuitries, and one or more processors coupled to the cache memory circuitries, the one or more processors to: determine a first message including a timestamp based on a time at which the network interface device is to access, from a host memory of the computing network, one or more data packet descriptors that correspond to a data packet to be transmitted to the computing network from the network interface device; send the first message for transmission to the network interface device; after sending the first message, receive, from the network interface device, a second message including a request to access the one or more data packet descriptors, the second message based on the timestamp; and in response to the second message, send the one or more data packet descriptors for transmission to the network interface device.

Example 15 includes the subject matter of Example 14, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

Example 16 includes the subject matter of Example 15, wherein the timestamp descriptor queue includes further includes, for respective ones of the plurality of timestamps, respective data packet descriptor pointers, the respective data packet descriptor pointers to provide corresponding references to the one or more data packet descriptors.

Example 17 includes the subject matter of Example 16, wherein the timestamp descriptor queue includes a plurality of slots of a same slot size, respective ones of the slots including a corresponding one of the plurality of timestamps, and a corresponding one of the data packet descriptor pointers.

Example 18 includes the subject matter of Example 14, the one or more processors to further: determine a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device; send the first messages for transmission to the network interface device; and receive, from the network interface device and based on the plurality of timestamps of respective ones of the first messages, second messages including requests to access data packet descriptors of data packets associated with the plurality of first messages; and send, for transmission to the network interface device, the data packet descriptors of the data packets associated with the plurality of first messages.

Example 19 includes the subject matter of Example 18, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

Example 20 includes the subject matter of Example 18, the one or more processors to further multiplex a plurality of the data packet descriptor pointers and a plurality of corresponding timestamps to determine the plurality of first messages.

Example 21 includes the subject matter of Example 15, the one or more processors to further: send, for transmission to the network interface device, a doorbell communication including tail information for the plurality of timestamps of the timestamp descriptor queue; and subsequent to sending the doorbell communication, send, for transmission to the network interface device, the timestamp descriptor queue.

Example 22 includes the subject matter of Example 15, the one or more processors to further: send, for transmission to the network interface device, a plurality of doorbell communications, individual ones of the doorbell communications including: tail information for a corresponding one of the plurality of timestamps of the timestamp descriptor queue; and a descriptor for the corresponding one of the plurality of timestamps; and subsequent to sending the plurality of doorbell communications, send, for transmission to the network interface device, the timestamp descriptor queue.

Example 23 includes the subject matter of Example 15, the one or more processors to send the data packet for transmission to the network interface device based on the timestamp.

Example 24 includes the subject matter of Example 23, wherein the data packet is a first data packet corresponding to a paced data packet based on the timestamp, the one or more processors to further send for transmission to the network interface device a second data packet corresponding to an unpaced data packet not based on a timestamp.

Example 25 includes the subject matter of Example 23, wherein the first message further includes one or more dummy timestamps distinct from the plurality of timestamps, and one or more corresponding data packet descriptors for unpaced data packets.

Example 26 includes the subject matter of any one of Examples 14-25, the one or more processors to further implement a synchronization of a timer of the server architecture with a timer of the network interface device.

Example 27 includes the subject matter of any one of Examples 14-26, further including a host interface coupled to the one or more processors, the host interface to communicate signals from the apparatus to a host interface of the network interface device.

Example 28 includes one or more non-transitory machine readable storage media having instructions stored thereon, the instructions, when executed by an apparatus of a computing node of a computing network, to cause the apparatus to perform operations including: determining a first message including a timestamp based on a time at which a network interface device of the computing network is to access, from a host memory of the computing network, one or more data packet descriptors that correspond to a data packet to be transmitted to the computing network from the network interface device; sending the first message for transmission to the network interface device; after sending the first message, receiving, from the network interface device, a second message including a request to access the one or more data packet descriptors, the second message based on the timestamp; and in response to the second message, sending the one or more data packet descriptors for transmission to the network interface device.

Example 29 includes the subject matter of Example 28, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

Example 30 includes the subject matter of Example 29, wherein the timestamp descriptor queue includes further includes, for respective ones of the plurality of timestamps, respective data packet descriptor pointers, the respective data packet descriptor pointers to provide corresponding references to the one or more data packet descriptors.

Example 31 includes the subject matter of Example 30, wherein the timestamp descriptor queue includes a plurality of slots of a same slot size, respective ones of the slots including a corresponding one of the plurality of timestamps, and a corresponding one of the data packet descriptor pointers.

Example 32 includes the subject matter of Example 28, the operations further including: determining a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device; sending the first messages for transmission to the network interface device; and receiving, from the network interface device and based on the plurality of timestamps of respective ones of the first messages, second messages including requests to access data packet descriptors of data packets associated with the plurality of first messages; and sending, for transmission to the network interface device, the data packet descriptors of the data packets associated with the plurality of first messages.

Example 33 includes the subject matter of Example 32, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

Example 34 includes the subject matter of Example 32, the operations further including multiplexing a plurality of the data packet descriptor pointers and a plurality of corresponding timestamps to determine the plurality of first messages.

Example 35 includes the subject matter of Example 29, the operations further including: sending, for transmission to the network interface device, a doorbell communication including tail information for the plurality of timestamps of the timestamp descriptor queue; and subsequent to sending the doorbell communication, sending, for transmission to the network interface device, the timestamp descriptor queue.

Example 36 includes the subject matter of Example 29, the operations further including: sending, for transmission to the network interface device, a plurality of doorbell communications, individual ones of the doorbell communications including: tail information for a corresponding one of the plurality of timestamps of the timestamp descriptor queue; and a descriptor for the corresponding one of the plurality of timestamps; and subsequent to sending the plurality of doorbell communications, sending, for transmission to the network interface device, the timestamp descriptor queue.

Example 37 includes the subject matter of Example 29, the operations further including sending the data packet for transmission to the network interface device based on the timestamp.

Example 38 includes the subject matter of Example 37, wherein the data packet is a first data packet corresponding to a paced data packet based on the timestamp, the operations further including sending for transmission to the network interface device a second data packet corresponding to an unpaced data packet not based on a timestamp.

Example 39 includes the subject matter of Example 38, wherein the first message further includes one or more dummy timestamps distinct from the plurality of timestamps, and one or more corresponding data packet descriptors for unpaced data packets.

Example 40 includes the subject matter of any one of Examples 28-39, the operations further including implementing a synchronization of a timer of the computing node with a timer of the network interface device.

Example 41 includes a method to be performed at an apparatus of a computing node of a computing network, the method including: determining a first message including a timestamp based on a time at which a network interface device of the computing network is to access, from a host memory of the computing network, one or more data packet descriptors that correspond to a data packet to be transmitted to the computing network from the network interface device; sending the first message for transmission to the network interface device; after sending the first message, receiving, from the network interface device, a second message including a request to access the one or more data packet descriptors, the second message based on the timestamp; and in response to the second message, sending the one or more data packet descriptors for transmission to the network interface device.

Example 42 includes the subject matter of Example 41, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

Example 43 includes the subject matter of Example 42, wherein the timestamp descriptor queue includes further includes, for respective ones of the plurality of timestamps, respective data packet descriptor pointers, the respective data packet descriptor pointers to provide corresponding references to the one or more data packet descriptors.

Example 44 includes the subject matter of Example 43, wherein the timestamp descriptor queue includes a plurality of slots of a same slot size, respective ones of the slots including a corresponding one of the plurality of timestamps, and a corresponding one of the data packet descriptor pointers.

Example 45 includes the subject matter of Example 41, the method further including: determining a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device; sending the first messages for transmission to the network interface device; and receiving, from the network interface device and based on the plurality of timestamps of respective ones of the first messages, second messages including requests to access data packet descriptors of data packets associated with the plurality of first messages; and sending, for transmission to the network interface device, the data packet descriptors of the data packets associated with the plurality of first messages.

Example 46 includes the subject matter of Example 45, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

Example 47 includes the subject matter of Example 45, the method further including multiplexing a plurality of the data packet descriptor pointers and a plurality of corresponding timestamps to determine the plurality of first messages.

Example 48 includes the subject matter of Example 42, the method further including: sending, for transmission to the network interface device, a doorbell communication including tail information for the plurality of timestamps of the timestamp descriptor queue; and subsequent to sending the doorbell communication, sending, for transmission to the network interface device, the timestamp descriptor queue.

Example 49 includes the subject matter of Example 42, the method further including: sending, for transmission to the network interface device, a plurality of doorbell communications, individual ones of the doorbell communications including: tail information for a corresponding one of the plurality of timestamps of the timestamp descriptor queue; and a descriptor for the corresponding one of the plurality of timestamps; and subsequent to sending the plurality of doorbell communications, sending, for transmission to the network interface device, the timestamp descriptor queue.

Example 50 includes the subject matter of Example 42, the method further including sending the data packet for transmission to the network interface device based on the timestamp.

Example 51 includes the subject matter of Example 50, wherein the data packet is a first data packet corresponding to a paced data packet based on the timestamp, the method further including sending for transmission to the network interface device a second data packet corresponding to an unpaced data packet not based on a timestamp.

Example 52 includes the subject matter of Example 52, wherein the first message further includes one or more dummy timestamps distinct from the plurality of timestamps, and one or more corresponding data packet descriptors for unpaced data packets.

Example 53 includes the subject matter of any one of Examples 41-52, the method further including implementing a synchronization of a timer of the server architecture with a timer of the network interface device.

Example 54 includes an apparatus of a network interface device of a computing network, the computing network including a host memory and a server architecture, the apparatus including a circuitry to: access a first message from the server architecture, the first message including a timestamp based on a time at which the network interface device is to access, from the host memory, one or more data packet descriptors that correspond to a data packet to be transmitted to the computing network from the network interface device; send, for transmission to the server architecture and at a transmission time based on the timestamp, a second message, the second message including a request to access the one or more data packet descriptors; and subsequent to sending the second message for transmission, access the one or more data packet descriptors to determine one or more addresses for the data packet in the host memory.

Example 55 includes the subject matter of Example 54, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

Example 56 includes the subject matter of Example 55, wherein the timestamp descriptor queue includes further includes, for respective ones of the plurality of timestamps, respective data packet descriptor pointers, the respective data packet descriptor pointers to provide corresponding references to the one or more data packet descriptors.

Example 57 includes the subject matter of Example 56, wherein the timestamp descriptor queue includes a plurality of slots of a same slot size, respective ones of the slots including a corresponding one of the plurality of timestamps, and a corresponding one of the data packet descriptor pointers.

Example 58 includes the subject matter of Example 54, the circuitry to further: access a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device; send, for transmission to the server architecture and at transmission times based on respective ones of the plurality of timestamps, respective second messages, including requests to access data packet descriptors of data packets associated with the plurality of first messages; and access, in response to sending the second messages for transmission, the one or more data packet descriptors to determine addresses in the host memory of the data packets associated with the plurality of first messages.

Example 59 includes the subject matter of Example 58, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

Example 60 includes the subject matter of Example 55, the circuitry to further: access a doorbell communication including tail information for the plurality of timestamps of the timestamp descriptor queue; subsequent to receiving the doorbell communication, send, for transmission to the server architecture, a descriptor request to access the timestamp descriptor queue based on the tail information; and subsequent to sending the descriptor request for transmission, access the timestamp descriptor queue.

Example 61 includes the subject matter of Example 55, the circuitry to further: access a plurality of doorbell communications, individual ones of the doorbell communications including: tail information for a corresponding one of the plurality of timestamps of the timestamp descriptor queue; and a descriptor for the corresponding one of the plurality of timestamps; and access the timestamp descriptor queue based on the plurality of doorbell communications.

Example 62 includes the subject matter of Example 55, the circuitry to further access the data packet from the host memory based on the timestamp.

Example 63 includes the subject matter of Example 62, wherein the data packet is a first data packet corresponding to a paced data packet based on the timestamp, the circuitry to further access, from the server architecture, a second data packet corresponding to an unpaced data packet not based on a timestamp.

Example 64 includes the subject matter of Example 63, wherein the first message further includes a dummy timestamp distinct from the plurality of timestamps, and one or more corresponding data packet descriptors for the unpaced data packet.

Example 65 includes the subject matter of Example 64, wherein the unpaced data packet is a first unpaced data packet, the circuitry further: to access a second unpaced data packet, the second unpaced data packet without a data packet descriptor in the first message; to assign a strict priority, for transmission to the network, to the paced data packet over the second unpaced data packet; and to send for transmission the paced data packet and the first unpaced data packet based on an order of presentation thereof in a data packet transmit queue at the network interface device.

Example 66 includes the subject matter of any one of Examples 58-65, the circuitry to further implement at least one of a de-jitter operation or a re-order operation on data packets associated with the first messages.

Example 67 includes the subject matter of any one of Examples 58-66, the circuitry to further implement a synchronization of a timer of the network interface device with a timer of the server architecture.

Example 68 includes a network interface device of a computing network, the computing network including a host memory and a server architecture, the network interface device including a host interface to communicate with a server architecture, and further including a circuitry coupled to the host interface to: access a first message from the server architecture, the first message including a timestamp based on a time at which the network interface device is to access, from the host memory, one or more data packet descriptors that correspond to a data packet to be transmitted to the computing network from the network interface device; send, for transmission to the server architecture and at a transmission time based on the timestamp, a second message, the second message including a request to access the one or more data packet descriptors; and subsequent to sending the second message for transmission, access the one or more data packet descriptors to determine one or more addresses for the data packet in the host memory.

Example 69 includes the subject matter of Example 68, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

Example 70 includes the subject matter of Example 69, wherein the timestamp descriptor queue includes further includes, for respective ones of the plurality of timestamps, respective data packet descriptor pointers, the respective data packet descriptor pointers to provide corresponding references to the one or more data packet descriptors.

Example 71 includes the subject matter of Example 70, wherein the timestamp descriptor queue includes a plurality of slots of a same slot size, respective ones of the slots including a corresponding one of the plurality of timestamps, and a corresponding one of the data packet descriptor pointers.

Example 72 includes the subject matter of Example 68, the circuitry to further: access a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device; send, for transmission to the server architecture and at transmission times based on respective ones of the plurality of timestamps, respective second messages, including requests to access data packet descriptors of data packets associated with the plurality of first messages; and access, in response to sending the second messages for transmission, the one or more data packet descriptors to determine addresses in the host memory of the data packets associated with the plurality of first messages.

Example 73 includes the subject matter of Example 72, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

Example 74 includes the subject matter of Example 69, the circuitry to further: access a doorbell communication including tail information for the plurality of timestamps of the timestamp descriptor queue; subsequent to receiving the doorbell communication, send, for transmission to the server architecture, a descriptor request to access the timestamp descriptor queue based on the tail information; and subsequent to sending the descriptor request for transmission, access the timestamp descriptor queue.

Example 75 includes the subject matter of Example 69, the circuitry to further: access a plurality of doorbell communications, individual ones of the doorbell communications including: tail information for a corresponding one of the plurality of timestamps of the timestamp descriptor queue; and a descriptor for the corresponding one of the plurality of timestamps; and access the timestamp descriptor queue based on the plurality of doorbell communications.

Example 76 includes the subject matter of Example 69, the circuitry to further access the data packet from the host memory based on the timestamp.

Example 77 includes the subject matter of Example 76, wherein the data packet is a first data packet corresponding to a paced data packet based on the timestamp, the circuitry to further access, from the server architecture, a second data packet corresponding to an unpaced data packet not based on a timestamp.

Example 78 includes the subject matter of Example 77, wherein the first message further includes a dummy timestamp distinct from the plurality of timestamps, and one or more corresponding data packet descriptors for the unpaced data packet.

Example 79 includes the subject matter of Example 78, wherein the unpaced data packet is a first unpaced data packet, the circuitry further: to access a second unpaced data packet, the second unpaced data packet without a data packet descriptor in the first message; to assign a strict priority, for transmission to the network, to the paced data packet over the second unpaced data packet; and to send for transmission the paced data packet and the first unpaced data packet based on an order of presentation thereof in a data packet transmit queue at the network interface device.

Example 80 includes the subject matter of any one of Examples 72-79, the circuitry to further implement at least one of a de-jitter operation or a re-order operation on data packets associated with the first messages.

Example 81 includes the subject matter of any one of Examples 72-80, the circuitry to further implement a synchronization of a timer of the network interface device with a timer of the server architecture.

Example 82 includes one or more non-transitory computer-readable media storing instructions which, when executed by an apparatus of a network interface device of a computing network, causes the apparatus to perform operations including: accessing a first message from a server architecture of the computing network, the first message including a timestamp based on a time at which the network interface device is to access, from a host memory of the computing network, one or more data packet descriptors that correspond to a data packet to be transmitted to the computing network from the network interface device; sending, for transmission to the server architecture and at a transmission time based on the timestamp, a second message, the second message including a request to access the one or more data packet descriptors; and subsequent to sending the second message for transmission, accessing the one or more data packet descriptors to determine one or more addresses for the data packet in the host memory.

Example 83 includes the subject matter of Example 82, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

Example 84 includes the subject matter of Example 83, wherein the timestamp descriptor queue includes further includes, for respective ones of the plurality of timestamps, respective data packet descriptor pointers, the respective data packet descriptor pointers to provide corresponding references to the one or more data packet descriptors.

Example 85 includes the subject matter of Example 84, wherein the timestamp descriptor queue includes a plurality of slots of a same slot size, respective ones of the slots including a corresponding one of the plurality of timestamps, and a corresponding one of the data packet descriptor pointers.

Example 86 includes the subject matter of Example 82, the operations further including: accessing a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device; sending, for transmission to the server architecture and at transmission times based on respective ones of the plurality of timestamps, respective second messages, including requests to access data packet descriptors of data packets associated with the plurality of first messages; and accessing, in response to sending the second messages for transmission, the one or more data packet descriptors to determine addresses in the host memory of the data packets associated with the plurality of first messages.

Example 87 includes the subject matter of Example 86, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

Example 88 includes the subject matter of Example 83, the operations further including: accessing a doorbell communication including tail information for the plurality of timestamps of the timestamp descriptor queue; subsequent to receiving the doorbell communication, sending, for transmission to the server architecture, a descriptor request to access the timestamp descriptor queue based on the tail information; and subsequent to sending the descriptor request for transmission, accessing the timestamp descriptor queue.

Example 89 includes the subject matter of Example 83, the operations further including: accessing a plurality of doorbell communications, individual ones of the doorbell communications including: tail information for a corresponding one of the plurality of timestamps of the timestamp descriptor queue; and a descriptor for the corresponding one of the plurality of timestamps; and accessing the timestamp descriptor queue based on the plurality of doorbell communications.

Example 90 includes the subject matter of Example 83, the operations further including accessing the data packet from the host memory based on the timestamp.

Example 91 includes the subject matter of Example 90, wherein the data packet is a first data packet corresponding to a paced data packet based on the timestamp, the operations further including accessing, from the server architecture, a second data packet corresponding to an unpaced data packet not based on a timestamp.

Example 92 includes the subject matter of Example 91, wherein the first message further includes a dummy timestamp distinct from the plurality of timestamps, and one or more corresponding data packet descriptors for the unpaced data packet.

Example 93 includes the subject matter of Example 92, wherein the unpaced data packet is a first unpaced data packet, the operations further including: accessing a second unpaced data packet, the second unpaced data packet without a data packet descriptor in the first message; assigning a strict priority, for transmission to the network, to the paced data packet over the second unpaced data packet; and sending for transmission the paced data packet and the first unpaced data packet based on an order of presentation thereof in a data packet transmit queue at the network interface device.

Example 94 includes the subject matter of any one of Examples 86-93, the operations further including implementing at least one of a de-jitter operation or a re-order operation on data packets associated with the first messages.

Example 95 includes the subject matter of any one of Examples 86-93, the operations further including implementing a synchronization of a timer of the network interface device with a timer of the server architecture.

Example 96 includes a method to be performed at an apparatus of a network interface device of a computing network, the method including: accessing a first message from the server architecture, the first message including a timestamp based on a time at which the network interface device is to access, from the host memory, one or more data packet descriptors that correspond to a data packet to be transmitted to the computing network from the network interface device; sending, for transmission to the server architecture and at a transmission time based on the timestamp, a second message, the second message including a request to access the one or more data packet descriptors; and subsequent to sending the second message for transmission, accessing the one or more data packet descriptors to determine one or more addresses for the data packet in the host memory.

Example 97 includes the subject matter of Example 96, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

Example 98 includes the subject matter of Example 97, wherein the timestamp descriptor queue includes further includes, for respective ones of the plurality of timestamps, respective data packet descriptor pointers, the respective data packet descriptor pointers to provide corresponding references to the one or more data packet descriptors.

Example 99 includes the subject matter of Example 98, wherein the timestamp descriptor queue includes a plurality of slots of a same slot size, respective ones of the slots including a corresponding one of the plurality of timestamps, and a corresponding one of the data packet descriptor pointers.

Example 100 includes the subject matter of Example 96, the method further including: accessing a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device; sending, for transmission to the server architecture and at transmission times based on respective ones of the plurality of timestamps, respective second messages, including requests to access data packet descriptors of data packets associated with the plurality of first messages; and accessing, in response to sending the second messages for transmission, the one or more data packet descriptors to determine addresses in the host memory of the data packets associated with the plurality of first messages.

Example 101 includes the subject matter of Example 100, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

Example 102 includes the subject matter of Example 97, the method further including: accessing a doorbell communication including tail information for the plurality of timestamps of the timestamp descriptor queue; subsequent to receiving the doorbell communication, sending, for transmission to the server architecture, a descriptor request to access the timestamp descriptor queue based on the tail information; and subsequent to sending the descriptor request for transmission, accessing the timestamp descriptor queue.

Example 103 includes the subject matter of Example 97, the method further including: accessing a plurality of doorbell communications, individual ones of the doorbell communications including: tail information for a corresponding one of the plurality of timestamps of the timestamp descriptor queue; and a descriptor for the corresponding one of the plurality of timestamps; and accessing the timestamp descriptor queue based on the plurality of doorbell communications.

Example 104 includes the subject matter of Example 97, the method further including accessing the data packet from the host memory based on the timestamp.

Example 105 includes the subject matter of Example 104, wherein the data packet is a first data packet corresponding to a paced data packet based on the timestamp, the method further including accessing, from the server architecture, a second data packet corresponding to an unpaced data packet not based on a timestamp.

Example 106 includes the subject matter of Example 105, wherein the first message further includes a dummy timestamp distinct from the plurality of timestamps, and one or more corresponding data packet descriptors for the unpaced data packet.

Example 107 includes the subject matter of Example 106, wherein the unpaced data packet is a first unpaced data packet, the method further including: accessing a second unpaced data packet, the second unpaced data packet without a data packet descriptor in the first message; assigning a strict priority, for transmission to the network, to the paced data packet over the second unpaced data packet; and sending for transmission the paced data packet and the first unpaced data packet based on an order of presentation thereof in a data packet transmit queue at the network interface device.

Example 108 includes the subject matter of any one of Examples 100-107, the method further including implementing at least one of a de-jitter operation or a re-order operation on data packets associated with the first messages.

Example 109 includes the subject matter of any one of Examples 100-107, the method further including implementing a synchronization of a timer of the network interface device with a timer of the server architecture.

Example A1 includes a computer program comprising the instructions of any one of Examples 28-40 and 82-95.

Example A2 includes an Application Programming Interface defining functions, methods, variables, data structures, and/or protocols for the instructions of any one of Examples 28-40 and 82-95.

Example A3 includes an apparatus comprising circuitry loaded with the instructions of any one of Examples 28-40 and 82-95.

Example A4 includes an apparatus comprising circuitry operable to run the instructions of any one of Examples 28-40 and 82-95.

Example A5 includes an integrated circuit comprising one or more of the processor circuitries of any one of Examples 1-13 and 54-67 and the one or more computer readable storage media of any one of Examples 28-40 and 82-95.

Example A6 includes a computing system comprising the one or more computer readable media of any one of Examples 28-40 and 82-95 and the one or more processing circuitries of any one of Examples 1-13 and 54-67.

Example A7 includes an apparatus comprising means for executing the method of any one of Examples 41-53 and 96-109.

Example A8 includes a signal generated as a result of executing the instructions of any one of Examples 28-40 and 82-95.

Example A9 includes a data unit generated as a result of executing the instructions of any one of Examples 28-40 and 82-95.

Example A10 includes the subject matter of Example A9, wherein the data unit is a datagram, network packet, data frame, data segment, a Protocol Data Unit (PDU), a Service Data Unit (SDU), a message, or a database object.

Example A11 includes a signal encoded with the data unit of any one of Examples A9-A10.

Example A12 includes an electromagnetic signal carrying the instructions of any one of Examples 28-40 and 82-95.

Example A13 includes the subject matter of any one of Examples 41-53 and 96-109, further comprising sending and receiving wireless communications using a transceiver coupled to the one or more processors.

Example A14 includes a machine-readable storage medium including machine-readable instructions which, when executed, implement the method of any one of Examples 41-53 and 96-109.

Example A15 includes a distributed edge computing system comprising: a central server; a plurality of computing nodes communicably coupled to the central server, at least one of the computing nodes including one or more processors and instructions that, when executed by the one or more processors, cause the at least one of the computing nodes to perform operations corresponding the method of any one of Examples 41-53 and 96-109.

The invention claimed is:

1. An apparatus of a network interface device of a computing network, the computing network including a host memory and a server architecture, the apparatus including a circuitry to:

access a first message from the server architecture, the first message including a timestamp based on a time at which the network interface device is to access, from the host memory, one or more data packet descriptors that correspond to a data packet to be transmitted to the computing network from the network interface device;

send, for transmission to the server architecture and at a transmission time based on the timestamp, a second message, the second message including a request to access the one or more data packet descriptors; and subsequent to sending the second message for transmission, access the one or more data packet descriptors to determine one or more addresses for the data packet in the host memory.

2. The apparatus of claim 1, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

3. The apparatus of claim 2, wherein the timestamp descriptor queue further includes, for respective ones of the plurality of timestamps, respective data packet descriptor pointers, the respective data packet descriptor pointers to provide corresponding references to the one or more data packet descriptors.

4. The apparatus of claim 3, wherein the timestamp descriptor queue includes a plurality of slots of a same slot size, respective ones of the slots including a corresponding one of the plurality of timestamps, and a corresponding one of the data packet descriptor pointers.

5. The apparatus of claim 1, the circuitry to further:

access a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device;

send, for transmission to the server architecture and at transmission times based on respective ones of the plurality of timestamps, respective second messages, including requests to access data packet descriptors of data packets associated with the plurality of first messages; and access, in response to sending the second messages for transmission, the one or more data packet descriptors to determine addresses in the host memory of the data packets associated with the plurality of first messages.

6. The apparatus of claim 5, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

7. The apparatus of claim 2, the circuitry to further:

access a doorbell communication including tail information for the plurality of timestamps of the timestamp descriptor queue;

subsequent to receiving the doorbell communication, send, for transmission to the server architecture, a descriptor request to access the timestamp descriptor queue based on the tail information; and subsequent to sending the descriptor request for transmission, access the timestamp descriptor queue.

8. The apparatus of claim 2, the circuitry to further:

access a plurality of doorbell communications, individual ones of the doorbell communications including:

tail information for a corresponding one of the plurality of timestamps of the timestamp descriptor queue; and a descriptor for the corresponding one of the plurality of timestamps; and access the timestamp descriptor queue based on the plurality of doorbell communications.

9. The apparatus of claim 2, the circuitry to further access the data packet from the host memory based on the timestamp.

10. The apparatus of claim 9, wherein:

the data packet is a first data packet corresponding to a paced data packet based on the timestamp, the circuitry to further access, from the server architecture, a second data packet corresponding to an unpaced data packet not based on a timestamp;

the first message further includes a dummy timestamp distinct from the plurality of timestamps, and one or more corresponding data packet descriptors for the unpaced data packet; and the unpaced data packet is a first unpaced data packet, the circuitry to further:

access a second unpaced data packet, the second unpaced data packet without a data packet descriptor in the first message;

assign a strict priority, for transmission to the network, to the paced data packet over the second unpaced data packet; and send for transmission the paced data packet and the first unpaced data packet based on an order of presentation thereof in a data packet transmit queue at the network interface device.

11. One or more non-transitory machine readable storage media having instructions stored thereon, the instructions, when executed by an apparatus of a computing node of a computing network, to cause the apparatus to perform operations including:

determining a first message including a timestamp based on a time at which a network interface device of the computing network is to access, from a host memory of the computing network, one or more data packet descriptors that correspond to a data packet to be transmitted to the computing network from the network interface device;

sending the first message for transmission to the network interface device;

after sending the first message, receiving, from the network interface device, a second message including a request to access the one or more data packet descriptors, the second message based on the timestamp; and in response to the second message, sending the one or more data packet descriptors for transmission to the network interface device.

12. The storage media of claim 11, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

13. The storage media of claim 12, wherein the timestamp descriptor queue further includes, for respective ones of the plurality of timestamps, respective data packet descriptor pointers, the respective data packet descriptor pointers to provide corresponding references to the one or more data packet descriptors.

14. The storage media of claim 13, wherein the timestamp descriptor queue includes a plurality of slots of a same slot size, respective ones of the slots including a corresponding one of the plurality of timestamps, and a corresponding one of the data packet descriptor pointers.

15. The storage media of claim 11, the operations further including:

determining a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device;

sending the first messages for transmission to the network interface device; and receiving, from the network interface device and based on the plurality of timestamps of respective ones of the first messages, second messages including requests to access data packet descriptors of data packets associated with the plurality of first messages; and sending, for transmission to the network interface device, the data packet descriptors of the data packets associated with the plurality of first messages.

16. The storage media of claim 15, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

17. The storage media of claim 16, the operations further including multiplexing a plurality of the data packet descriptor pointers and a plurality of corresponding timestamps to determine the plurality of first messages.

18. A method to be performed at an apparatus of a computing node of a computing network, the method including:

determining a first message including a timestamp based on a time at which a network interface device of the computing network is to access, from a host memory of the computing network, one or more data packet descriptors that correspond to a data packet to be transmitted to the computing network from the network interface device;

sending the first message for transmission to the network interface device;

after sending the first message, receiving, from the network interface device, a second message including a request to access the one or more data packet descriptors, the second message based on the timestamp; and in response to the second message, sending the one or more data packet descriptors for transmission to the network interface device.

19. The method of claim 18, wherein the first message corresponds to a timestamp descriptor queue, the timestamp descriptor queue comprising a plurality of timestamps that include the timestamp, individual ones of the plurality of timestamps to indicate a corresponding time at which the network interface device is to access, from the host memory, one or more data packet descriptors that correspond to an associated data packet to be transmitted to the computing network from the network interface device.

20. The method of claim 19, wherein the timestamp descriptor queue includes further includes, for respective ones of the plurality of timestamps, respective data packet descriptor pointers, the respective data packet descriptor pointers to provide corresponding references to the one or more data packet descriptors.

21. The method of claim 18, the method further including:

determining a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device;

sending the first messages for transmission to the network interface device; and receiving, from the network interface device and based on the plurality of timestamps of respective ones of the first messages, second messages including requests to access data packet descriptors of data packets associated with the plurality of first messages; and sending, for transmission to the network interface device, the data packet descriptors of the data packets associated with the plurality of first messages.

22. A network interface device of a computing network, the computing network including a host memory and a server architecture, the network interface device including a host interface to communicate with a server architecture, and further including a circuitry coupled to the host interface to:

access a first message from the server architecture, the first message including a timestamp based on a time at which the network interface device is to access, from the host memory, one or more data packet descriptors that correspond to a data packet to be transmitted to the computing network from the network interface device;

send, for transmission to the server architecture and at a transmission time based on the timestamp, a second message, the second message including a request to access the one or more data packet descriptors; and subsequent to sending the second message for transmission, access the one or more data packet descriptors to determine one or more addresses for the data packet in the host memory.

23. The network interface device of claim 22, the circuitry to further:

access a plurality of first messages corresponding to timestamp descriptor queues, individual ones of the first messages comprising a plurality of timestamps, individual ones of the plurality of timestamps to indicate a corresponding time at which the network interface device is to access, from the host memory, one or more data packet descriptors that correspond to an associated data packet to be transmitted to the computing network from the network interface device;

send, for transmission to the server architecture and at transmission times based on respective ones of the plurality of timestamps, respective second messages, including requests to access data packet descriptors of data packets associated with the plurality of first messages; and access, in response to sending the second messages for transmission, the one or more data packet descriptors to determine addresses in the host memory of the data packets associated with the plurality of first messages.

24. The network interface device of claim 23, wherein individual ones of the first messages further include, for respective ones of their plurality of timestamps, respective data packet descriptor pointers, individual ones of the data packet descriptor pointers to provide references to one or more corresponding data packet descriptors of an associated data packets to be transmitted.

25. The network interface device of claim 24, the circuitry to further: access a doorbell communication including tail information for the plurality of timestamps of one of the timestamp descriptor queues; subsequent to receiving the doorbell communication, send, for transmission to the server architecture, a descriptor request to access the timestamp descriptor queue based on the tail information; and subsequent to sending the descriptor request for transmission, access the timestamp descriptor queue.

\* \* \* \* \*